March 24, 1959
W. J. ELY
2,878,766
APPARATUS FOR FORMING TUBES
Filed July 30, 1953
12 Sheets-Sheet 1
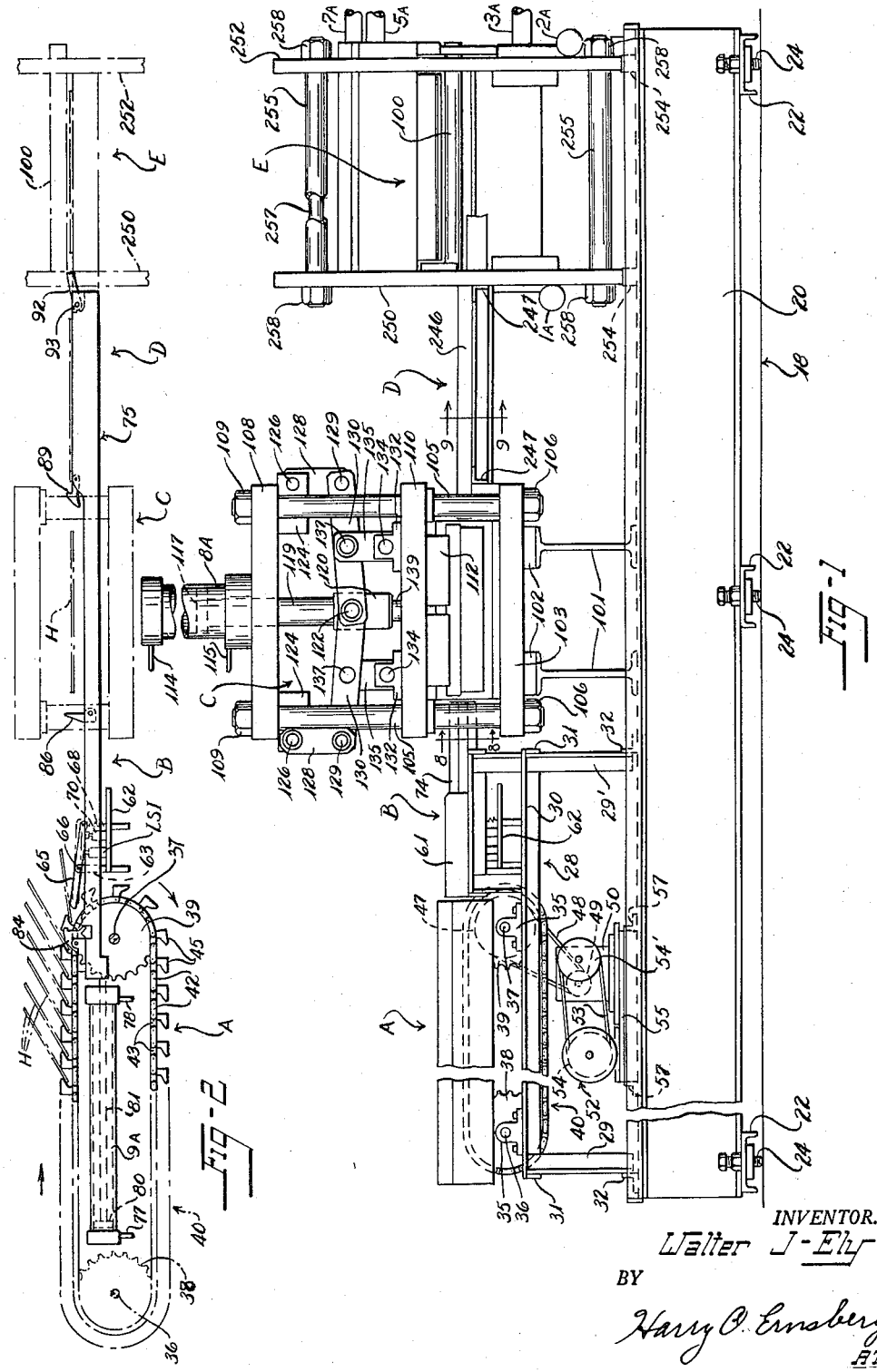
INVENTOR.
Walter J. Ely
BY
Harry O. Ernsberger
ATTY-

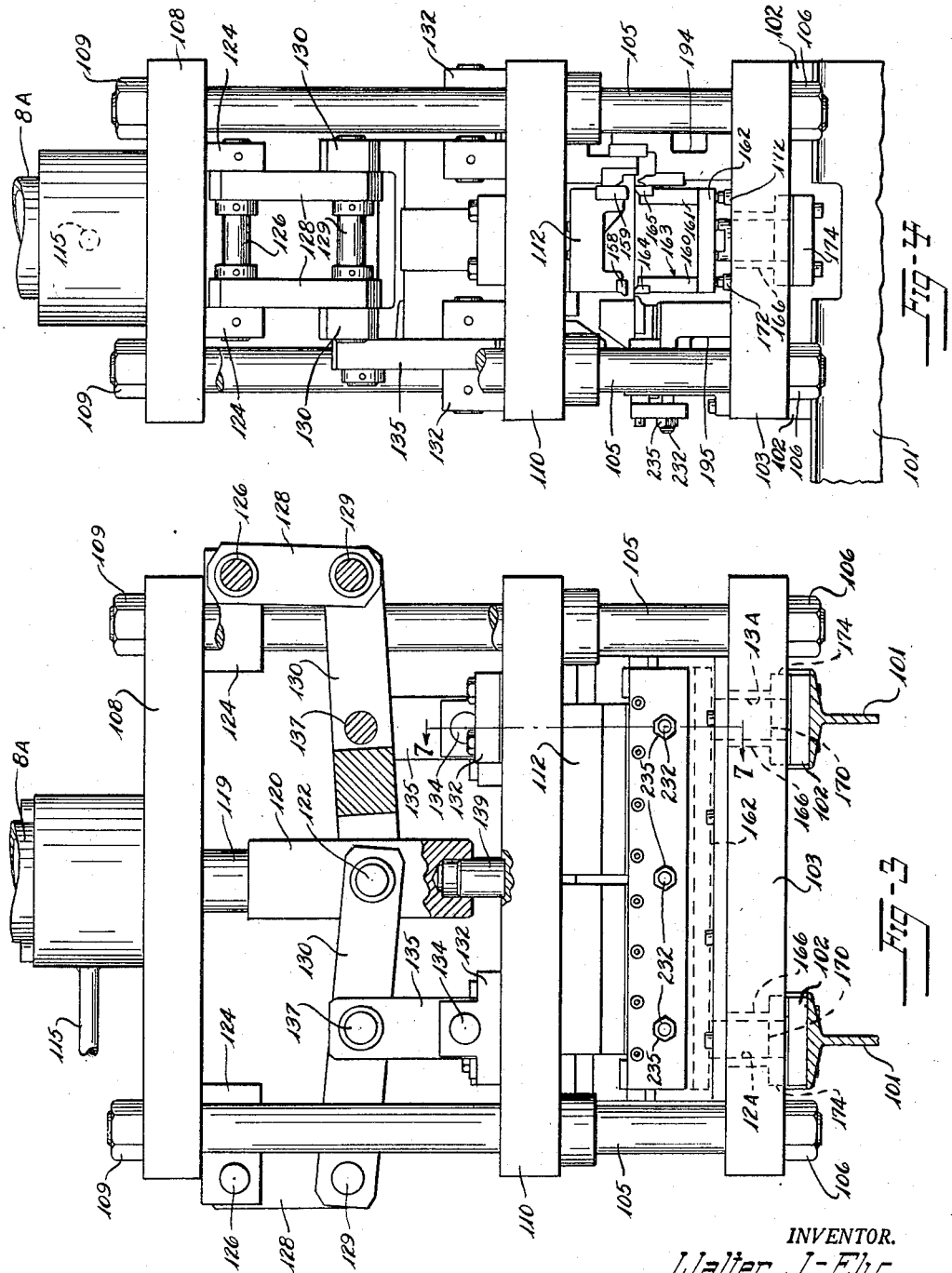

INVENTOR.
Walter J. Ely
BY
Harry O. Ernsberger
ATTY.

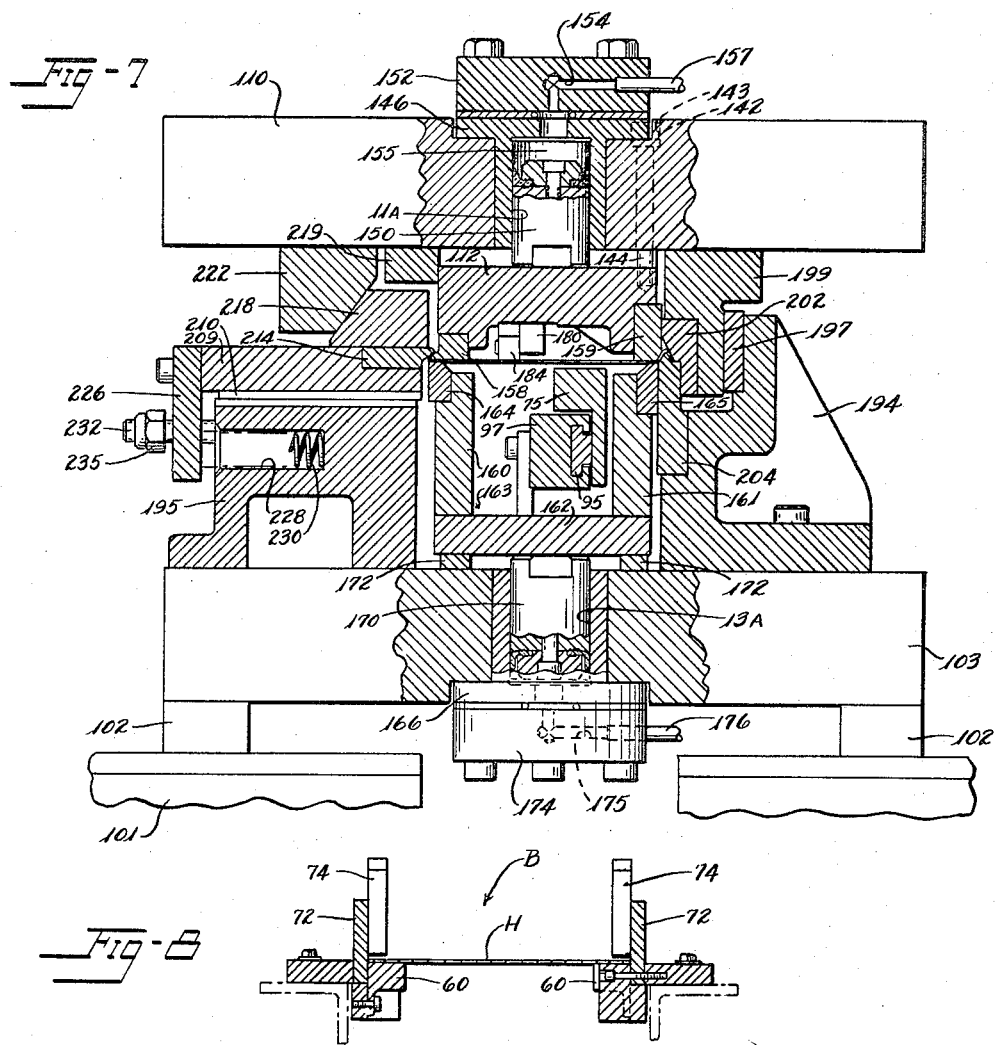
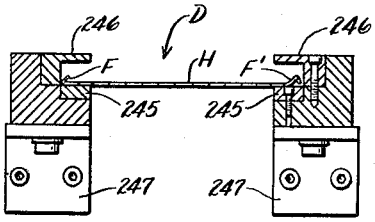
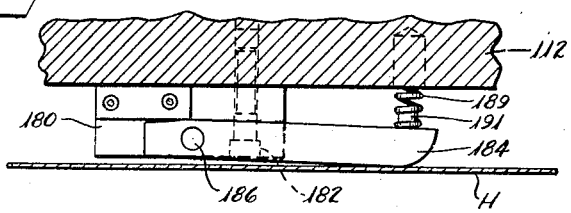
March 24, 1959 — W. J. ELY — 2,878,766
APPARATUS FOR FORMING TUBES
Filed July 30, 1953 — 12 Sheets-Sheet 4
INVENTOR.
Walter J. Ely
BY Harry O. Ernsberger
ATTY.

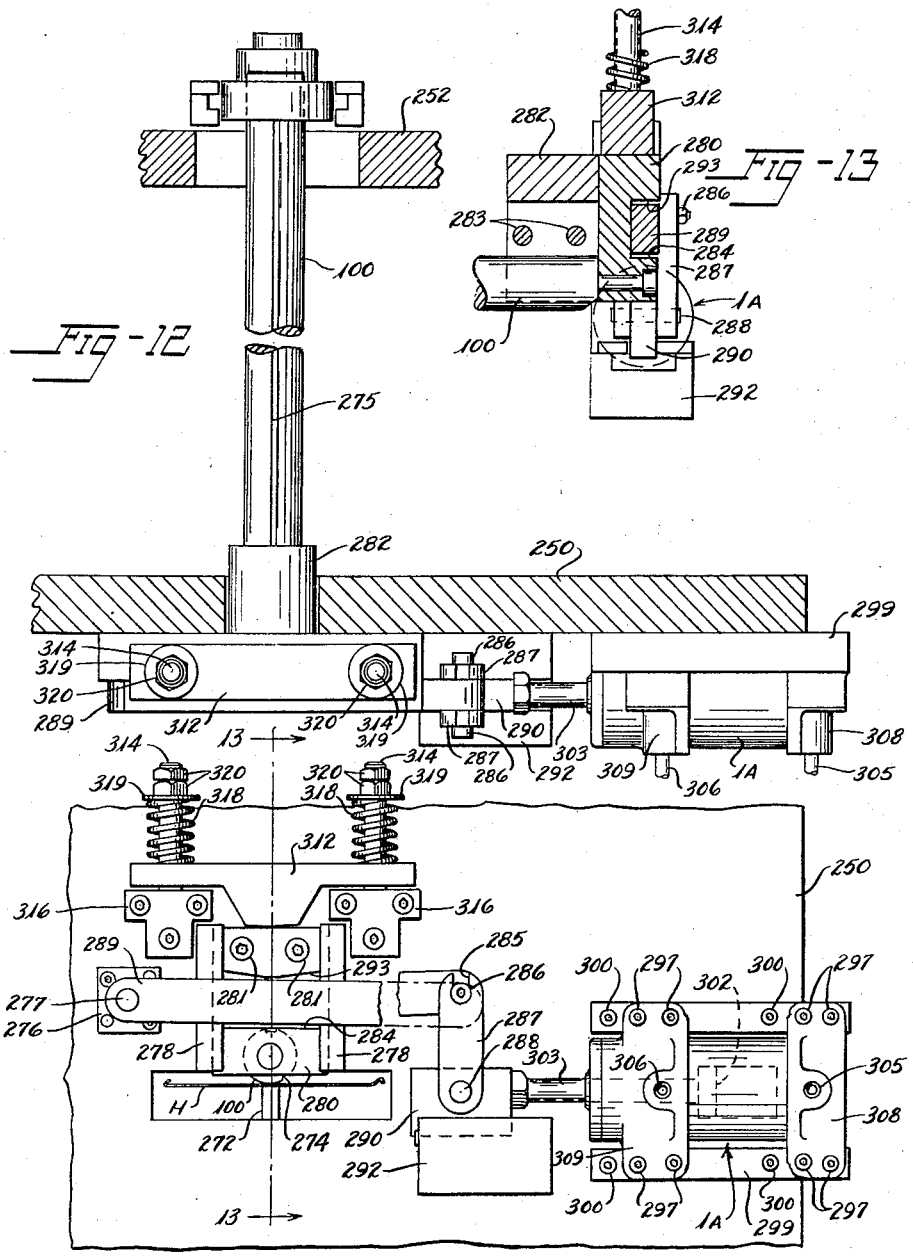

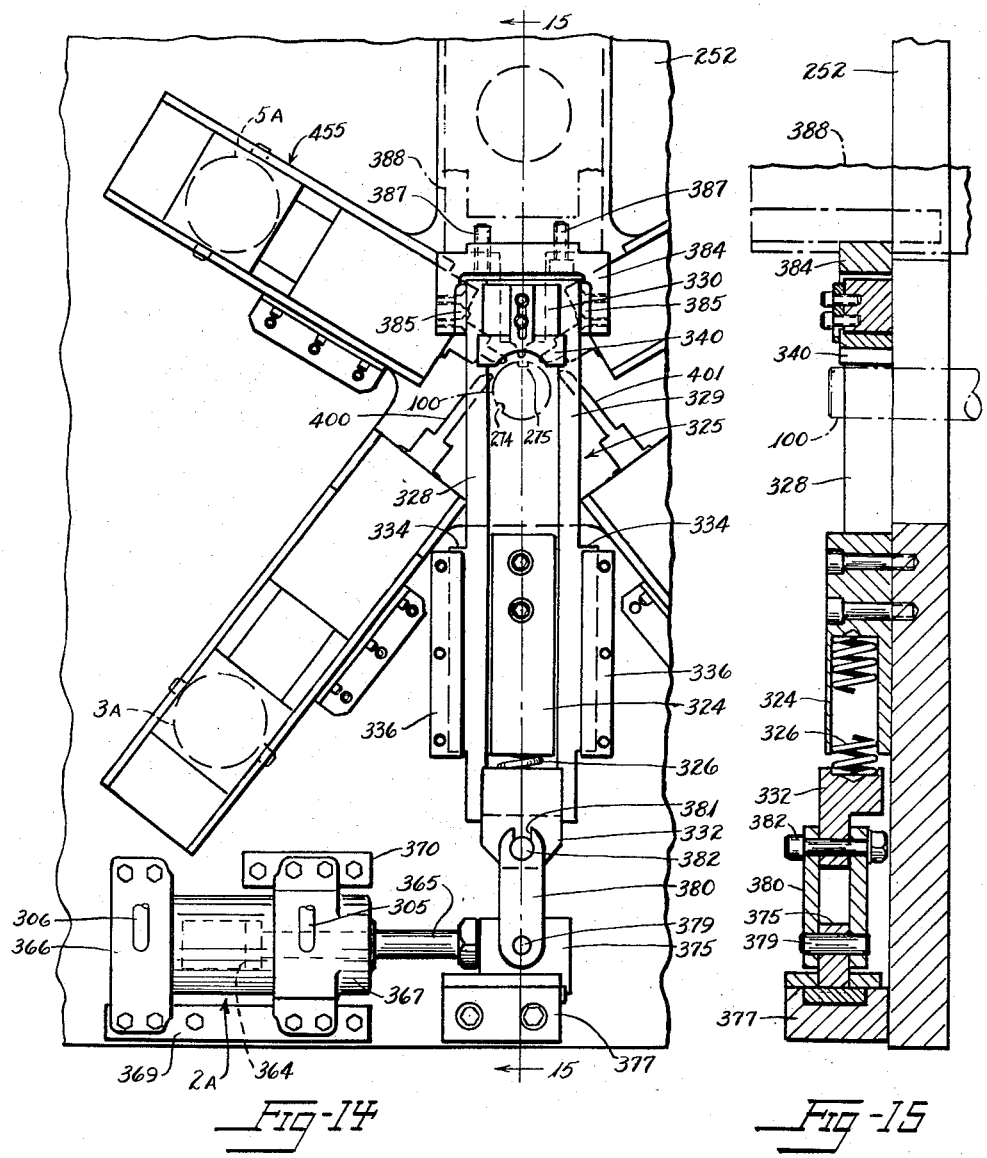

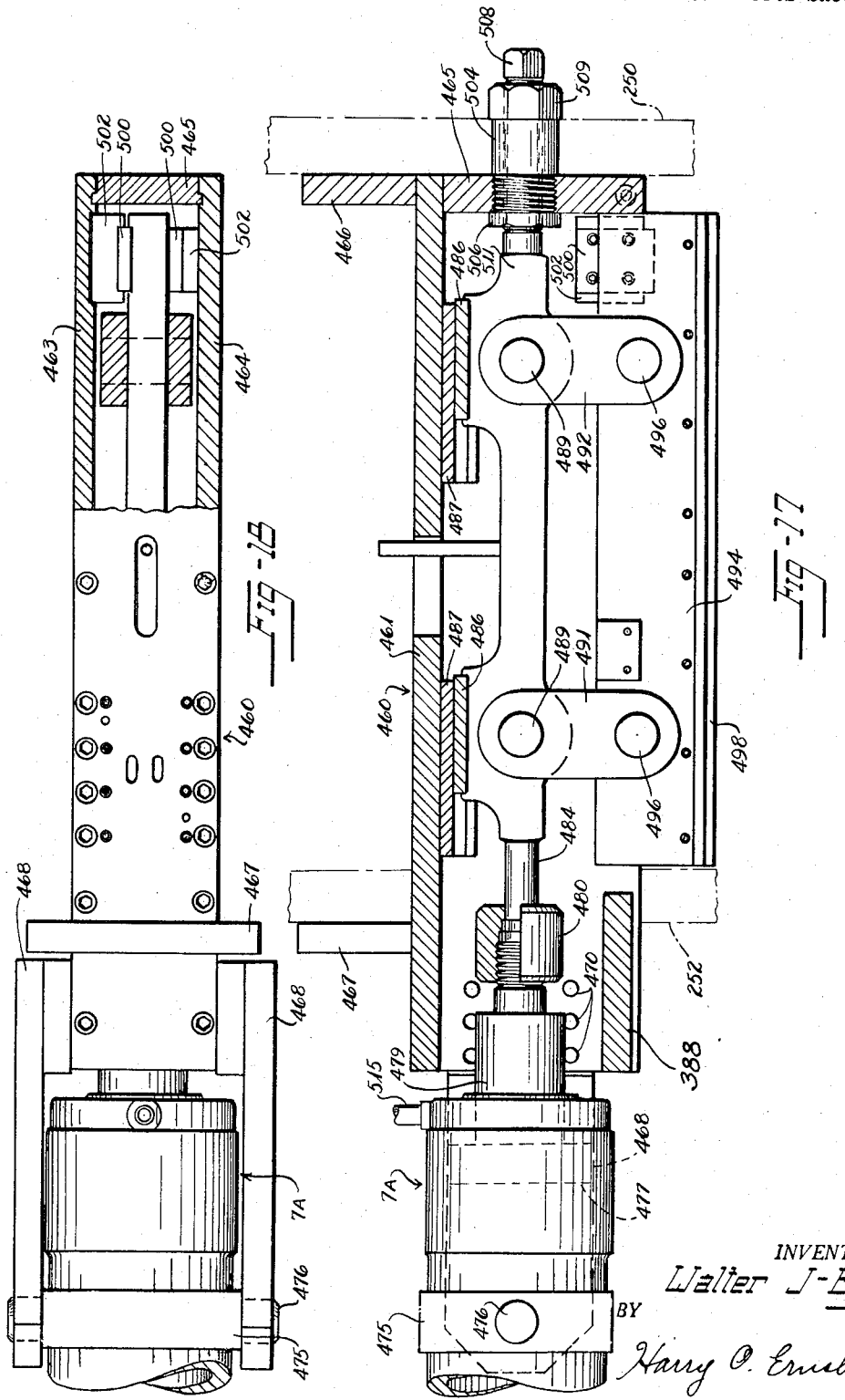

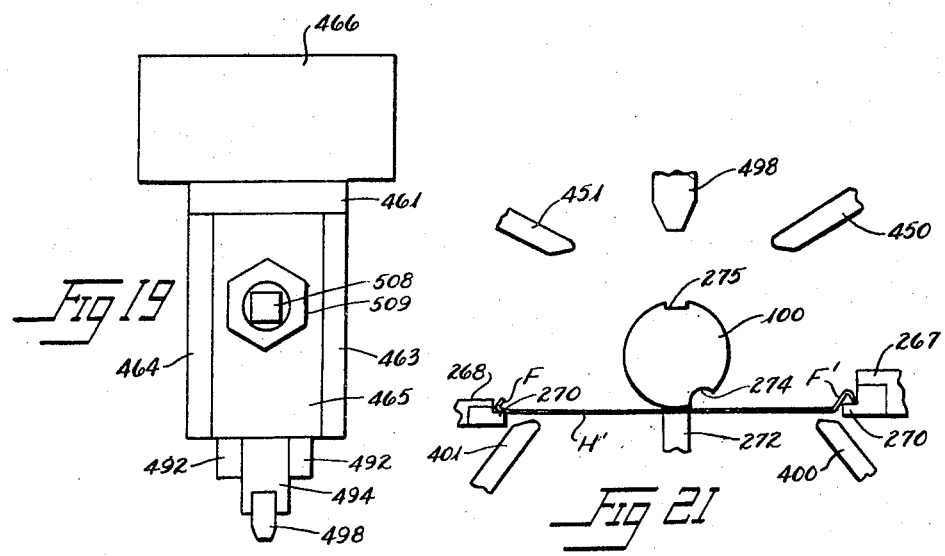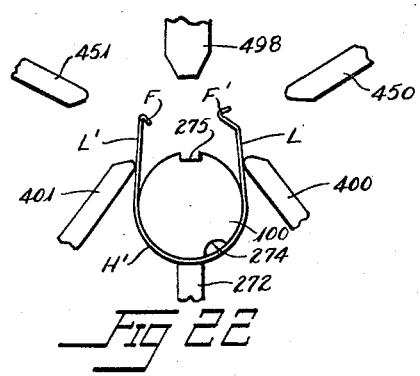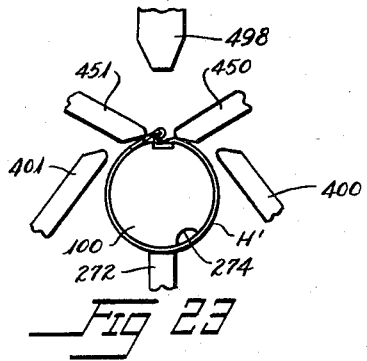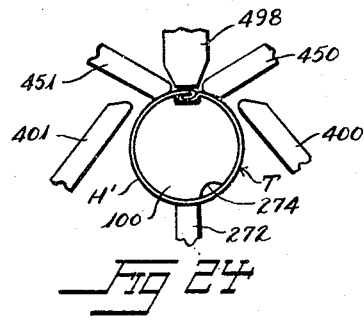

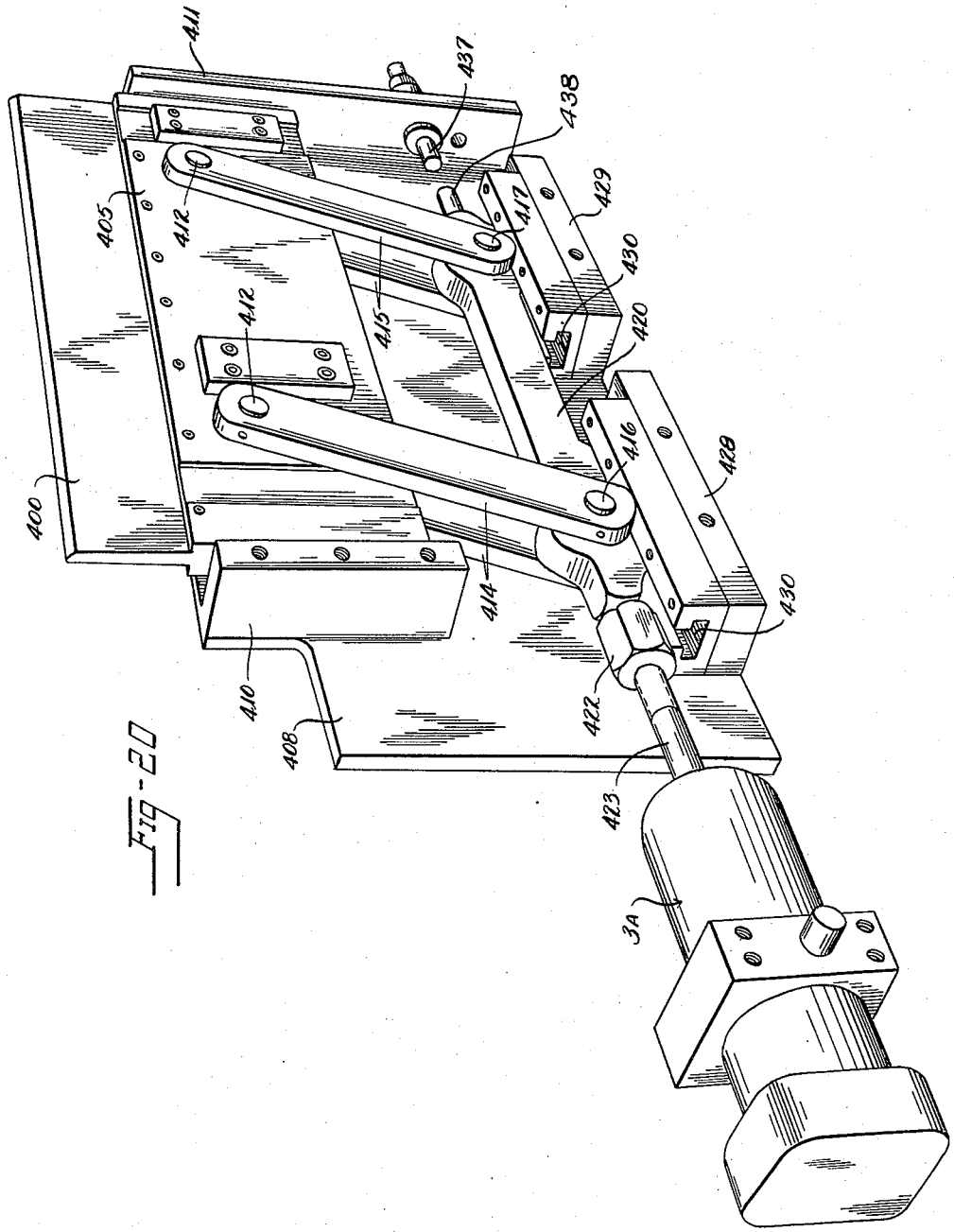

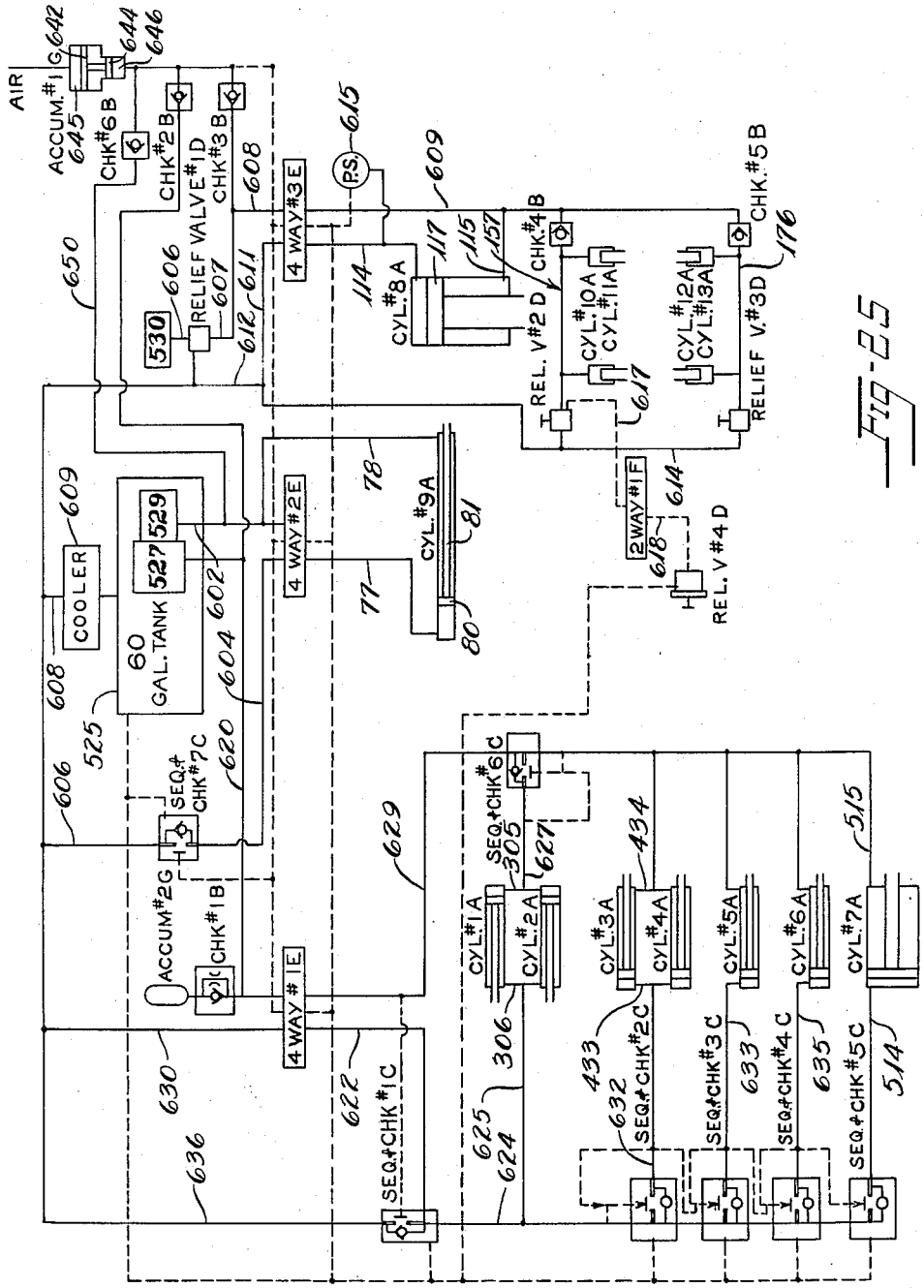

United States Patent Office 2,878,766
Patented Mar. 24, 1959

2,878,766

APPARATUS FOR FORMING TUBES

Walter J. Ely, Grand Haven, Mich., assignor to Oldberg Manufacturing Company, Grand Haven, Mich., a corporation of Michigan Application July 30, 1953, Serial No. 371,257

5 Claims. (Cl. 113—34)

This invention relates to method and apparatus for forming articles from sheet metal and more especially to the production of tubular members from sheets of metal.

The invention embraces a novel method and apparatus for configurating and processing sheet metal blanks into tubular formation utilizing a plurality of coacting and intercoacting instrumentalities or mechanisms arranged to perform successive operations upon the sheet metal blanks including the shaping of the edges of the sheets at one station, and forming or bending the sheets to tubular shape, interlocking the shaped edge portions and forming a seam at the interlocking edges at another station to provide a tubular shape in the finished article.

The present invention has particular utility in the formation of intermediate shells, tubes or ducts for assembly in sound attenuating mufflers for use with moving gas streams, especially mufflers for attenuating sound waves entrained in exhaust gas streams of internal-combustion engines. A muffler construction or sound attenuating device for use with an exhaust gas stream includes an outer shell or casing, usually of round or oval configuration in cross section, provided interiorly with an arrangement of sound attenuating chambers, baffles and gas passage means or intermediate shells. The outer shell or casing construction is provided with end heads respectively equipped with gas inlet and outlet passages or tubes to facilitate movement of exhaust gases through the muffler. In order to properly correlate and assemble the gas passage tubes or intermediate shells and other components within the outer shell, it is imperative that the tubes or intermediate shells be of substantially uniform cross section throughout their length in order to assure a proper fit with the other components in the outer shell.

An object of the present invention is the provision of apparatus especially adapted for producing tubular members wherein a uniform cross-sectional dimension or size is maintained throughout the length of the shell, the apparatus being especially adapted to produce large quantities of tubes by automatic means.

An object of the invention is the provision of apparatus adapted to successively perform operations upon metal blanks utilized in forming the tubular constructions wherein bending and forming operations are performed through the use of instrumentalities engaging the sheet metal blank throughout its full length whereby stresses tending to impart distortion or twist to the blank during the operations of bending and configurating the blank to tubular formation are equalized or eliminated throughout the length of the sheet or tube.

Another object of the invention resides in the provision of an apparatus for forming blanks into tubular configuration wherein opposed edges of a blank are shaped to a predetermined configuration at one station while another blank, having preformed edges, is fashioned into tubular shape and a lock seam formed therein at an adjacent station, the instrumentalities for carrying on these operations being completely automatic in their operation.

Another object of the invention is the provision of means for forming substantially flat blanks having flanged edge portions into closed configuration through the utilization of a plurality of blank engaging devices operable in successive relation to progressively shape the blank into tubular configuration and lock seaming edges of the blank to form a closed tube.

Another object of the invention resides in a method of forming a blank to a closed tubular configuration involving the successive application of fluid pressure actuated devices progressively engageable with the blank and effective throughout the length of the blank whereby the finished or completed tube formed therefrom is of a uniform cross-sectional dimension throughout its length.

Another object of the invention is the provision of a series of cooperating instrumentalities automatically operative in sequential relation whereby a substantially flat sheet of metal delivered to a loading station is operated upon by the said instrumentalities whereby the sheet or blank is fashioned into a tube which is of uniform cross-sectional dimension throughout its length and is automatically discharged from the instrumentalities as a finished product.

Another object of the invention is the provision of a plurality of cooperating instrumentalities especially adaptable and adjustable to form completed tubes of various dimensions and shapes from flat blanks of sheet metal, providing an apparatus which is versatile in its application for use in producing tubes of different sizes.

Another object of the invention resides in the provision of a plurality of cooperating instrumentalities in which electrically controlled, hydraulically actuated means are utilized in initiating and carrying out the operations of the various instrumentalities in feeding the blanks from an edge forming station to a bending and seaming station independently of manual operations.

A further object resides in the utilization of a relatively movable mandrel cooperable with an anvil or member for securely retaining a blank adjacent the mandrel during tube forming operations.

Still a further object is the provision of a plurality of fluid pressure actuated bars or members adapted for engagement in proper sequence with a blank for bending or forming the blank about the mandrel and for interlocking the edges of the blank to complete the formation of a tube.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic elevational view illustrating the several stations and the apparatus and instrumentalities for carrying out the steps or operations of the method of the invention;

Figure 2 is a semidiagrammatic elevational view illustrating a portion of the apparatus of Figure 1 showing the method and means for successively advancing the blanks through the several stations;

Figure 3 is an elevational view of the apparatus for forming flanges on opposed edges of the blanks;

Figure 4 is an end view of the apparatus shown in Figure 3;

Figure 7 is a transverse sectional view through the die means showing the die means in fully closed position, the view being taken substantially on the line 7—7 of Figure 3;

Figure 8 is a detail sectional view taken substantially on the line 8—8 of Figure 1 showing a blank at the feeding station;

Figure 9 is a detail sectional view taken substantially on the line 9—9 of Figure 1 showing a blank at an idle station;

Figure 10 is a detail sectional view taken substantially on the line 10—10 of Figure 5;

Figure 11 is a fragmentary view illustrating the mandrel supporting means;

Figure 12 is a top plan view of the structure shown in Figure 11;

Figure 13 is a fragmentary detail sectional view taken substantially on the line 13—13 of Figure 11;

Figure 14 is a fragmentary elevational view of a portion of the rear end of the tube forming apparatus illustrating a movable thrust means associated with the mandrel;

Figure 15 is a vertical sectional view taken substantially on the line 15—15 of Figure 14;

Figure 17 is a fragmentary detail view, certain parts being shown in section, of the tube seam completing means;

Figure 18 is a plan view of the structure shown in Figure 17;

Figure 19 is an end view of the construction shown in Figure 17;

Figure 20 is a perspective view of one of the tube forming instrumentalities;

Figure 21 is a diagrammatic view illustrating the initial position of a blank adjacent the mandrel;

Figure 22 illustrates the step of forming the blank to a U-shape;

Figure 23 illustrates the step of completing the tubular formation interlocking the flanges of the blank;

Figure 24 illustrates the step of completing the interlocked seam of the tube;

Figure 25 is a schematic diagram of the hydraulic or pressure fluid system for actuating various components or mechanisms of the apparatus.

Figure 5:
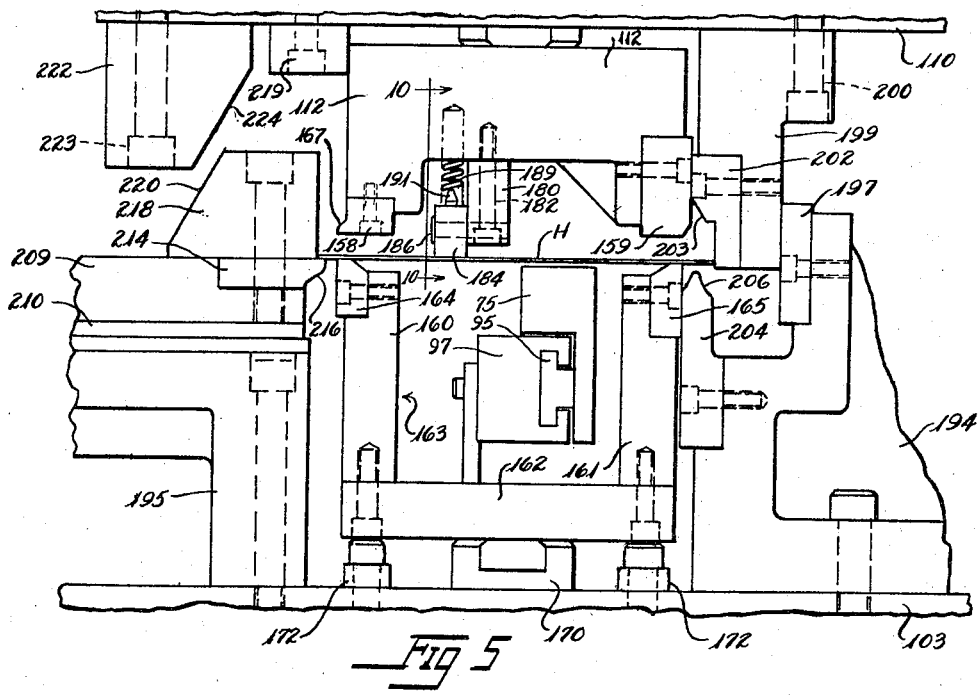
Figure 5 is a detail end view of the die means for forming flanges on opposed edge zones of the blanks.

While the apparatus illustrated in the drawings is of a character particularly adaptable for performing the method operations or steps of the invention in forming tubes from sheets of metal and especially tubular shells utilized as gas passage tubes for installation or incorporation in sound attenuating devices or mufflers for use with moving gas streams, it is to be understood that the principles of the invention and the various mechanisms forming components of the invention may be employed for forming various types of tubular members.

Referring to the drawings in detail and initially to Figures 1 and 2, there is illustrated in semidiagrammatic representation an apparatus for carrying out the method of the invention in forming tubes and exemplifies the several stations or positions occupied by the metal blanks during the processing thereof through the apparatus of the invention. The position A of Figures 1 and 2 at the left side of the sheet indicates the blank loading station. B indicates a feeding station or primary idle station occupied by a blank preparatory to its delivery to station C at which station opposed edge zones of the blank are bent or configurated to form flanges.

A flanged blank is moved from station C to station D which is a temporary idle position or station from which the blanks having preformed edges are moved into the tube forming station E. It is to be understood that, in a normal operation of the apparatus in carrying out the method of the invention, at the completion of a processing operation at stations C and E the blanks at each of these stations and those at feeding station B and idle station D are successively moved to the next succeeding station.

Thus during one complete cycle of the apparatus, a blank is edged at station C and concomitantly therewith the blank at station E is formed into tubular configuration. Mechanism is then operated which concomitantly performs the following functions: the finished tube at station E is stripped from the forming station in a right-hand direction as viewed in Figures 1 and 2, the blank at idle station D, having preformed edges, is transferred to the tube forming station E, the blank at station C, having preformed edges, is moved to the idle station D, the blank at the feeding station B is conveyed or transferred to the edge configurating station C and a blank from the loading station A is delivered to the blank feeding station B.

The several components or mechanisms of the apparatus are preferably mounted upon a suitable frame 18 which is inclusive of longitudinally extending parallel I beams 20 joined by transversely extending members 22 as shown in Figure 1, the members 22 being provided with pairs of leveling screws 24 for properly leveling the frame upon a floor or other support.

The apparatus comprising the blank loading means at the blank loading station is carried upon a suitable supplemental frame 28 formed of pairs of upwardly extending members 29 and 29', longitudinally extending members 30 joining the pairs of uprights, and transversely extending members 31 and 32, the latter members being supported upon the parallel frame members 20. Mounted upon the frame members 30 are pairs of journal blocks 35 which form bearings for shafts 36 and 37 which respectively support pairs of sprockets 38 and 39 as particularly shown in Figure 2. The pairs of sprockets 38 and 39 form supports for an endless conveyor 40 in the form of a pair of chains comprising pairs of links 42 and connecting links 43.

The links 42 of each chain are formed or provided with projecting lugs or shoes 45 which are adapted to receive sheet metal blanks H which are supported by the chain conveyor 40 in an angular position with respect to the direction of movement of the upper flight of the conveyor as shown in Figure 2. The upper flight of the conveyor 40 is moved in a righthand direction as viewed in Figures 1 and 2 for advancing or conveying the blanks H to the primary idle station or feeding station B.

Driving means is provided for the conveyor 40 which includes a sprocket 47 carried by shaft 37 connected by means of a chain 48 with a sprocket 49 driven by a speed changing means (not shown) contained within a housing 50. The speed changing mechanism in the housing 50 is of conventional construction and is driven by an electrically energized motor 52 through a belt 53 and pulleys 54 and 54'. The motor 52 and housing 50 enclosing the speed changing mechanism are supported upon a plate or member 55 supported on cross members 57 mounted on frame members 20. The speed changing mechanism contained within the housing 50 is provided with a speed changing control means (not shown) for varying the rate of travel of the blank supporting conveyor 40 so as to properly correlate the feeding or advancing of the blanks with other mechanisms of the apparatus.

In the embodiment illustrated, the blanks H are manually deposited in the successive pairs of blank supporting and advancing shoes 45 as shown in Figure 2, but the blanks may be fed to the conveyor by automatic means if desired.

The blanks H are advanced to the feeding station B, and as the conveyor chains move around the sprocket 39, the blanks are successively deposited at the station B upon a plurality of magnetized supporting blocks 60, the blanks being prevented from transverse movement by means of longitudinally extending guide plates 61. The deposition of a blank upon the blocks 60 at the feeding station B initiates a cycle of operations in forming a tube from the blank.

As shown in Figure 2 there is provided a support 62 having an upwardly extending member 63 upon which is pivotally mounted an arm or lever 65 by means of a pivot pin 66, the lever 65 being normally inclined upwardly toward an oncoming blank in the position shown in Figure 2. The lever 65 is biased to its initial position under the influence of a contractile spring 68. The limit switch LS1 for initiating the cycle of operations is adapted to be actuated by movement of the lever 65 when a blank engages the upwardly inclined lever causing the lever to swing in a counterclockwise direction about the pivot shaft 66 as viewed in Figure 2. An adjustable stop 70 in the form of a threaded member is carried by the support and engages the lever 65 to adjust and determine the initial inclined position of the lever 65.

The blank deposited at the primary idle or feed station B is contained between guide bars 72 to properly direct the blank into the apparatus at station C for configurating or flanging the opposed edges of the blank. The blocks 60 shown in Figure 8 supporting the blank at the feeding station B are preferably of magnetic steel, providing a permanent magnetic force to restrain the blank against inadvertent lengthwise displacement at the blank feeding station B. In movement away from the station B, the blank passes beneath guide shoes 74 to hold the blank in proper horizontal position as it enters the station C.

Means are provided for concurrently moving several blanks through the successive stations so that a new blank is placed into the cycle of operations upon the completion of each tube and the discharge of the tube from the forming station E. As shown semidiagrammatically in Figure 2, the bar 75 extends through stations B, C and D. The bar 75 is adapted to be reciprocated by suitable actuating means, and as shown in Figure 2, fluid pressure means, such as hydraulic means, is utilized for moving the bar.

The hydraulic means is inclusive of a cylinder 9A connected at its ends with hydraulic fluid lines or conduits 77 and 78 for conveying fluid to and from the cylinder 9A. A piston 80 slidably disposed in the cylinder is carried upon the end of a piston rod 81, the latter being connected to one end of the bar 75.

When fluid is introduced in the left end of the cylinder 9A, as viewed in Figure 2, the bar 75 is moved in a righthand direction to advance the blanks at the stations to successive stations. The introduction of fluid in the opposite end of the cylinder through conduit 78 causes return movement of the bar 75 in a lefthand direction. The bar 75 is provided with pawls or abutments adapted for engagement with the blanks for moving the blanks to successive stations. The bar 75 is centrally disposed between the conveyor chains 40 at the loading station and extends to a zone at the entrance of the forming station E.

The end of the bar adjacent the cylinder 9A is provided with a pivotally supported pawl or latch 84 which is adapted, upon movement of the bar in a righthand direction, to engage a blank that has been deposited at the feeding station B by the conveyor 40. The pawl 84 carries the blank into operative position to be acted upon by the edge forming means at station C. A second pawl 86 is pivotally supported upon the bar 75 and is adapted to engage a blank in station C after the edges thereof have been flanged to move the flanged blank to the idle station D. A third pawl 89 is pivotally supported upon the bar 75 and is adapted to engage the blank in station D and convey the same to the tube forming mechanism at station E.

The righthand end of the bar 75 as viewed in Figure 2 is equipped with a pawl or member 92 pivotally supported upon a pin 93, the free end of the pawl 92 bearing against mandrel 100, and forms a stripping means for stripping or discharging a finished tube from the mandrel 100 when the bar 75 is moved in a righthand direction as viewed in Figure 2. The pawls 86 and 89 and the stripper member or pawl 92 are resiliently biased in an upward direction by means of suitable springs (not shown) so that during movements of the bar 75 in a righthand direction, the pawls are in positions to engage the blanks in the manner hereinbefore described.

The resilient means engaging the pawls provides for relative swinging movement of the pawls to ride beneath the blanks in the several stations without disturbing the positions of the blanks upon retractive movement of the bar 75 in a left-hand direction as viewed in Figure 2. The bar 75 is provided with a T-shaped section 95 which is mounted in suitable longitudinally spaced supports 97 which have portions engaging the T-shaped section 95 to support and guide the bar 75 during its reciprocatory movements. The bar 75 may be made in a plurality of linear sections joined together by suitable means or it may be formed as a single member.

The blanks delivered by the loading conveyor 40 to the feeding station B are advanced or transferred by the bar 75 to the station C at which station the opposed edges of the blank are flanged to a configuration suitably adapted to form an interlocking seam when the blank has been fashioned into a tubular shape. The flanges at the opposite sides of the blank are of dissimilar configuration and are formed by a compound die means including a punch and die construction involving a fluid pressure actuated means for supporting a blank. The edge forming means at station C is mounted upon a suitable structure carried upon the main frame members 20.

As shown in Figure 1, transversely extending I beams 101, supported upon the longitudinally extending beams 20, support blocks 102 upon which is mounted a substantially rectangular bedplate 103. Secured in openings formed in the corner zones of plate 103 are upwardly extending shafts or rods 105 which are secured to the plate by means of nuts 106 engaging threaded tenon portions on the shafts. Mounted upon the upper ends of the shafts 105 is a plate 108 which is secured in place by securing nuts 109. Disposed intermediate the plates 103 and 108 is a movable ram or press plate 110 which has openings formed therein to receive the shafts or rods 105, the latter serving to guide the plate 110 during vertical movements of the plate.

The movable plate or ram 110 carries the male die or punch 112, the plate 110 and punch 112 being actuated by fluid pressure or hydraulic means through a suitable linkage mechanism. As shown in Figure 1, hydraulic cylinder 8A is supported upon the stationary plate 108 and is provided with fluid inlet and outlet tubes 114 and 115. A piston 117 is reciprocable in the cylinder 8A and is carried at the upper end of a piston rod 119 to the lower end of which is secured a fitting 120 which is provided with a transversely extending stub shaft 122. The fitting 122 is connected with the movable plate 110 through mechanism hereinafter described.

Secured to the lower face of the plate 108 are blocks 124 provided with pins 126 which form pivotal supports for connecting links 128, the lower ends of which are pivotally connected by means of stub shafts 129 with the outer ends of levers or yokes 130, the inner ends of which are connected by means of the shaft 122 with the fitting 120 carried by the piston rod 119. Secured to the movable plate 110 is a plurality of blocks 132 having openings to accommodate shafts 134 to which are connected links 135, the upper ends of the links being connected by means of stub shafts 137 to the levers 130 intermediate the ends thereof. The lower end of the fitting 120 is provided with a cylindrical opening into which projects pilot or guide 139 which is secured to the movable plate or ram 110, the guide serving to cause the piston rod 119 to move in a rectilinear direction.

Thus movement imparted to the piston rod 119 and fitting 120 through the ingress and egress of fluid into and away from the cylinder 8A causes vertical reciprocatory movement of the plate 110 through the linkage mechanism hereinbefore described. The hydraulic force derived from the actuator cylinder 8A is amplified through the linkage mechanism to provide a very high pressure effective upon plate 110 and the punch or male die 112 carried thereby in performing flanging operations on the metal blanks.

The apparatus at station C includes an arrangement for obtaining a compound action of the flanging punch and die construction supplementing the movement of the plate 110 which effects additional vertical movement of the flanging means or dies through the utilization of hydraulic means in addition to the hydraulic actuator 8A. As shown in Figure 7, the male die 112 is carried by the movable plate 110 by means of headed screws 142, the heads of which project into counterbores 143 formed in plate 110, threaded tenons 144 being threaded into openings in the male die 112.

In this manner relative movement is permitted between the movable press plate or ram 110 and the male die 112. Secured in bores in plate 110 adjacent the end zones of the male die 112 are fittings 146 formed with sleeve portions providing respectively cylinders 10A and 11A, in each of which is reciprocably mounted a piston or plunger 150. Secured to each of the fittings 146 is a head structure 152 having a fluid passage 154 therethrough in communication with the space 155 above the piston 150 in each of the cylinders 10A and 11A. A tube or conduit 157 is connected with each cylinder head 152 and is in communication with the passage 154 for conveying fluid into and away from the cylinders.

For purposes of description, the so-called male die has been designated 112 and the secondary or lower die has been designated 163. These die elements or components are both relatively movable, and while they cooperate with other elements to form flanged configurations on the edges of the blank, their primary purpose is to grip the blank and move the same in vertical directions into engagement with flange forming elements arranged adjacent the die elements 112 and 163. The male die 112 is equipped with hardened forming blocks or bars 158 and 159.

The secondary or blank holding die 163 is formed of elements 160, 161 and 162, the element 160 carrying a hardened forming block 164 and the element 161 carrying a hardened forming block 165. The lower or holding die construction is arranged for movement relative to the stationary plate 103. As shown in Figures 3 and 7, the plate 103 is provided with an opening adjacent each end zone of the lower die 163 in which are disposed fittings 166 similar to fittings 146 carried by the plate 110, the fittings 166 providing cylinders 12A and 13A in which are disposed pistons or plungers 170, the plungers being adapted to engage the plate 162 of the lower die 163. The lowermost position of movement of the lower or holding die is defined by abutments or stops 172 carried by the stationary plate 103. Each fitting 166 is provided with a head 174 having a passage 175 therein in communication with the cylinder beneath the piston 170. A tube or pipe 176 is connected with a source of pressure fluid for moving piston 170 for purposes hereinafter explained.

A means is provided for exerting a retaining or frictional force or pressure against a blank H when the blank is first moved into position between the dies 112 and 163 at station C. As shown in detail in Figures 5 and 10, a block 180 is secured to the male or upper die 112 by means of bolts 182. A blank engaging shoe or member 184 is pivotally supported upon the block by means of a headed shaft 186 projecting through aligned openings formed in the shoe and block. The member or shoe 184 is resiliently biased toward and into engagement with the blank by an expansive coil spring 189 seated in a bore in the male die 112, a portion of the spring surrounding a positioning pin 191 carried by the shoe 184. By this means the shoe 184 is biased into frictional engagement with the blank while it is disposed between the dies 112 and 163 to prevent displacement of the blank.

Figure 6:
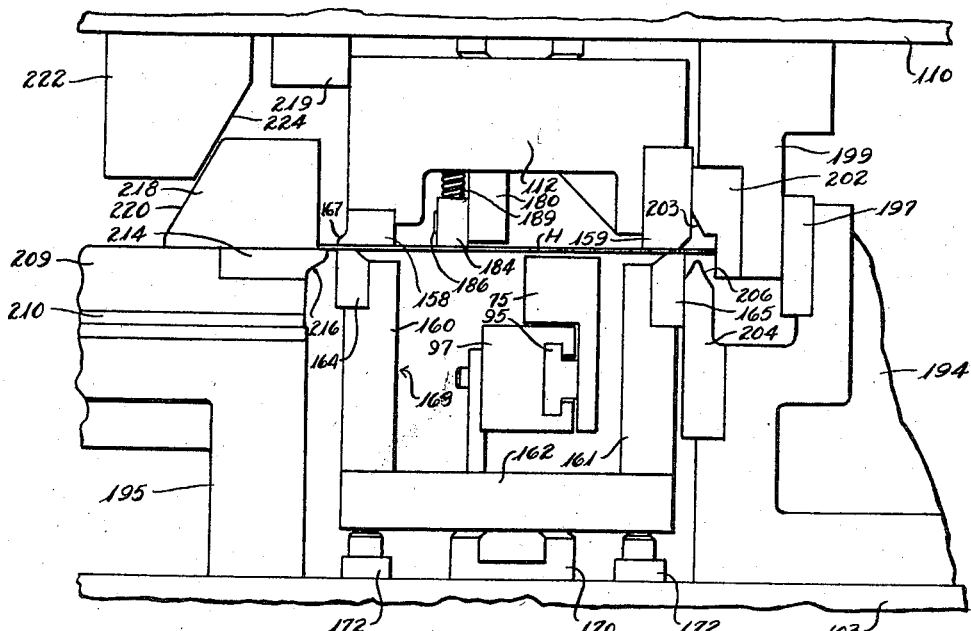
Figure 6 is a view similar to Figure 5 showing the die means in another position during the formation of flanges on the blanks.

Mounted upon the stationary plate 103 are members 194 and 195 disposed respectively at the sides of the dies as shown in Figures 5, 6 and 7. The support or member 194 is provided with a plate 197 which forms a thrust and guide surface for a member 199 which is secured to the relatively movable plate 110 by securing screws 200. The member 199 carries a plate or member 202 which has an angularly disposed surface 203 adapted to engage an edge of the blank during edge flanging operations, the member 202 being movable with the plate 110 and the supporting member 199. Fixedly secured to the support 194 is a plate 204 having an upwardly extending projection 206 having angularly arranged, converging surfaces which cooperate with surfaces on plates 159 and 202 for configurating the edge zone of the blank with a flange F' at the right side of the blank H as viewed in Figures 7 and 9.

The member 195 supports a member 209 formed with projections 210 fitting into ways or channels formed in the support 195 and extending transversely of the longitudinal axis of the dies to facilitate reciprocatory movement of member 209 toward and away from the dies 112 and 163. Secured to the member 209 is a plate 214 having a ledge or projecting portion 216 adapted to cooperate with the dies for forming the flange F on the left edge of the blank H as viewed in Figures 7 and 9. Secured to member 209 is a block 218 having a longitudinally extending angularly disposed cam surface 220. Secured to the relatively movable plate 110 is a cam block 222 formed with a cam surface 224 adapted for engagement with cam surface 220 on block 218 when the plate 110 is moved downwardly. The cam block 222 is secured to plate 110 by means of screws 223. It will be apparent from Figures 6 and 7 that upon downward movement of the plate 110, the cam block 222 engages and moves the block 218, flange forming plate 214 and member 209 in a righthand direction to bend the left edge portion of the blank about the projection 167 formed on plate 158 carried by the male die. A block 219 secured to plate 110 serves as a guide for one side of the die 112 and plate 202 serves as a guide for the opposite side.

Secured to member 209 is a block or plate 226 which extends downwardly from the member 209 as shown in Figure 7. The support 195 is provided with a plurality of longitudinally spaced bores 228 forming sockets or enclosures for expansive coil springs 230 which exert a force against plate 226 in a lefthand direction as viewed in Figure 7 to normally maintain the block 218, member 209 and bar 214 in their maximum lefthand position of movement. A plurality of longitudinally spaced threaded members 232 carried by the support 195 extend through clearance openings formed in plate 226, the threaded member 232 accommodating nuts 235 which form limiting means or stops adapted to be engaged by the plate 226 to determine the initial or normal position of plate 226 and components connected therewith. The springs 230 serve to retract members 209, 214 and 218 to their initial positions when the cam block 222 is moved upwardly by plate 110 and out of engagement with the block 218.

Briefly, the operations of the means above described for flanging the edges of the blanks are as follows. A blank H is delivered by the transfer bar 75 from the feeding station B to the flanging station C, the blank lying upon the upper surfaces of the hardened plates or bars 164, 165 of the die 163, as shown in Figure 5. The spring-biased shoe 184 serves to prevent slippage of the blank until the upper or male die 112 engages the blank. Under the influence of fluid under pressure admitted to cylinder 8A through tube 114, the piston 117 and rod 119 are moved downwardly which causes downward movement of plate 110 through the linkage mechanism shown in Figures 1, 3 and 4. The plungers or pistons 150 and 170 in cylinders 11A and 13A, respectively, are fluid actuated and controlled by means hereinafter described for controlling certain relative movements of the die elements 112 and 163.

The initial downward movement of plate 110 causes elements 112 and 163 to move to grip the blank between the die elements 112 and 163 as shown in Figure 6. As the blank is moved downwardly, approaching the position shown in Figure 7, the righthand edge of the blank engages the projection 206 on bar 204 and the edge zone of the blank is bent upwardly into coincidence with an angularly disposed surface on the bar 159. Concurrently with this action, the left edge zone of the blank engages projetcion 216 on bar 214 which bends the edge zone of the blank upwardly, approximately at right angles to the plane of the blank. Upon relieving the fluid pressure in cylinders 10A and 11A, further downward movement of plate 110 brings the surface 203 of bar 202 into engagement with the righthand edge zone of the blank to bend a portion of the edge zone over the projection 206 on bar 204 to form a flange construction including an inverted V-shaped recess at the right edge zone of the blank as shown in Figure 7. Concurrently with this action, the downward movement of plate 110 engages the cam surface 224 of cam block 222 with the cam surface 220 of member 218 causing movement of bar 214 and projection 216 formed thereon in a righthand direction. The projection 216, moving in a righthand direction as viewed in Figure 7, completes the bending of the vertical flange on the blank into the hook-like position around the projection 167, thus completing the flange formations or configurations F and F' on the blank as shown in Figure 7.

The retractive or upward movement of plate 110, coupled with fluid pressure control of pistons or plungers 150 and 170, effects a withdrawal and disengagement of the flange forming mechanisms in a manner hereinafter explained, leaving the flanged blank supported upon bars 164 and 165 in position to be moved by the transfer means or bar 75 to the idle station D.

For purposes of identification, an unflanged blank is herein designated H and a flanged blank is designated H'.

The blank transferring bar 75 moves the flanged blank H' to idle station D. As shown in Figure 9, the blank H' is supported upon bars 245, and lateral movement is prevented by longitudinally extending guide plates 246. The blank supporting and guiding means are supported upon pairs of spaced L-shaped members 247 shown in Figures 1 and 9.

The flanged blank H' is conveyed by the transfer means 75 from the idle station D to mechanism and instrumentalities at station E for forming the flanged blank H' into a tube. The mechanisms at station E for accomplishing these functions are shown in Figures 11 through 24. The mechanisms at station E are supported upon a frame structure carried by the longitudinally extending beams 20. The frame structure includes a pair of longitudinally spaced, vertically disposed plates 250 and 252. The plates 250 and 252 are mounted upon blocks or pads 254 which are secured to and supported by the beams 20. The plates are spaced apart by means of spacing sleeves 255 abutting the inner surfaces of the plates. Bolts or rods 257 extend through openings in the plates and through the spacing sleeves 255 and are provided with nuts 258 threaded upon the ends of the rods 257 to securely hold the plates in proper position.

The mandrel 100 is disposed in horizontal position extending through openings in the plates 250 and 252. In the operations of forming a tube at station E, the flanged blank H' is wrapped around the mandrel, the preformed or flanged edges interlocked, a seam formed at the interlock to complete the tube and the completed tube stripped from the mandrel 100. The flanged blank is wrapped around the mandrel and the seaming operation is effected by hydraulically actuated means in the manner hereinafter described.

Arranged between the plates 250 and 252 and extending parallel with the mandrel 100 are bars 263 and 264 which support plates 265 and 266, respectively, the plates 265 and 266 being provided with hardened blank supporting bars 267 and 268, respectively. Each of the bars 267 and 268 is provided with a projecting ledge 270, the ledges directly supporting the blank H' received from the idle station D through the action of the transfer bar 75 and the blank engaging pawl 92. An anvil in the form of a bar 272 is fixedly disposed directly beneath and extends in parallelism with the mandrel 100. The mandrel is provided with a recess 274 to accommodate the stripper pawl 92 and a second recess 275 to accommodate the formation of the seam in a tube.

The mandrel 100 is arranged for relative vertical movement in order to facilitate the initial positioning of a blank H' between the mandrel and the anvil 272. The mandrel is supported at the blank-entrance end adjacent the plate 250 as shown in Figures 11, 12 and 13. Mounted upon the exterior surface of the plate 250 is a pair of vertically disposed bars 278 forming ways between which is slidably disposed a carriage or member 280. Secured to the member 280 by screws 281 is a mandrel supporting bushing or holder 282 which extends through a suitable opening in the plate 250. The holder 282 has portions straddling the mandrel which are drawn into clamping engagement with the mandrel by screws 283. The member 280 is formed with a slot 284 to accommodate an arm or lever 289. Secured to the plate 250 is a block 276 which is provided with a head pin 277 forming a pivotal support for one end of the arm 289, the latter extending through the slot 284 in the plate 280 and having its other end provided with a stub shaft or pin 286 received in a slot 285 formed in one end of a yoke-like connecting link 287. The link 287 is pivotally connected at its other end with a stub shaft or pin 288 carried by a fitting or crosshead 290 reciprocably supported in ways formed in a block 292 secured to the frame plate 250.

A fluid actuator or cylinder 1A is provided for operating this mechanism and is secured by means of bolts 297 to plates 299 which in turn are secured to plate 150 by means or bolts 300. Disposed within the cylinder 1A is a piston 302 secured to the end of a piston rod 303 which is connected to the crosshead or member 290. Tubes or conduits 305 and 306 are connected respectively to the cylinder heads 308 and 309 for conveying fluid into and away from the cylinder 1A.

As the arm 289 is moved upwardly by impressing fluid pressure into the cylinder through tube 305, the arm engages the upper wall 293 of slot 284, elevating the carriage 280 and the mandrel 100 so as to provide clearance between the lower surface of the mandrel and the anvil 272.

The mandrel is normally urged or biased to its lowermost position by resilient means. As particularly shown in Figure 11 there is disposed above the block or carriage 280 a pressure bar or pad 312. The end zones of the bar 312 are formed with openings to receive studs 314 which are threaded into blocks 316 secured to the exterior face of plate 250. Surrounding each of the studs 314 is an expansive coil spring 318. A disk or washer 319 forms a thrust surface for said springs and pairs of threaded nuts 320 are threaded upon the upper zones of the studs 314 and are adjustable to vary the force of springs 318. Thus the mandrel 100 is normally resiliently biased toward its lowermost position through the expansive pressure of springs 318 acting through the pressure pad 312, the block 280 and the mandrel supporting clamp 282. In the illustrated embodiment the mandrel 100 is supported only at the entrance end of station E in order to facilitate stripping finished tubes from the other end of the mandrel.

The arrangement includes means disposed adjacent to and engageable with the free end of the mandrel for exerting a downward thrust thereon in order to securely hold the blank between the mandrel and the anvil 272 during tube forming operations, this mechanism being shown in detail in Figures 14 and 15. Secured to the exterior face or surface of the plate 252 is a block 324 which is bored to receive an expansive coil spring 326. Disposed vertically and adjacent the exterior face of plate 252 is a slidable structure or yoke 325 formed by parallel members 328, 329 joined at their upper ends by means of a bar or block 330 and at their lower ends by a member 332. Each of the bars 328 and 329 is provided with a transversely extending projection 334 adapted for slidable movement in guide bars 336 to assure rectilinear movement of the yoke. The lower end of spring 326 is seated in a shallow recess formed in the member 332, the spring being under compression and serving to bias the block 340 toward engagement with the end zone of the mandrel 100.

Secured to the lower portion of plate 252 is a hydraulic actuator including a cylinder 2A in which is slidably disposed a piston 364 mounted on the end of a piston rod 365. The cylinder 2A is provided with head structures 366 and 367 which are secured to bars or member 369 and 370 which, in turn, are secured to the plate 252. The head 366 is connected with the tube or pipe 306 leading to one end of cylinder 1A, and the head 367 is connected with the pipe 305 as shown in Figure 25 whereby the cylinders 1A and 2A are actuated simultaneously.

The piston rod 365 is fixedly secured to a crosshead 375 slidably supported in a block or fitting 377. Links 380 are pivotally connected to the crosshead 375 by means of a pin or stub shaft 379, the upper ends of the links 380 being provided with slots 381 to receive a pin 382 carried by the block 332, the links 380 forming thrust members for moving the slidable frame or yoke structure 325 upwardly when fluid is introduced into the cylinder 2A through the tube 306 to move the abutment or thrust block 340 out of engagement with the mandrel 100 as shown in Figure 14.

Just prior to the operation of mechanisms for forming the blank around the mandrel 100, fluid is introduced through conduit 305 into the cylinder 2A at the right side of the piston 364 as viewed in Figure 14 causing movement of the piston and crosshead 375 in a left-hand direction; and under the influence of the expansive spring 326, the yoke or movable frame 325 is biased downwardly bringing the abutment block 340 into engagement with the upper surface of the mandrel 100. This downward thrust of the yoke 325 serves to aid in clamping the blank between the lower surface zone of the mandrel 100 and the anvil 272.

Guide means is provided for the upper end of the yoke 325, the said means including a U-shaped member 384 provided with hardened wear plates 385 engaging the outer surfaces of the members 328 and 329 as shown in Figure 14. The U-shaped guide member 384 is secured by means of screws 387 to a member 388 which, in turn, is secured to the frame plate 252.

Figure 16:
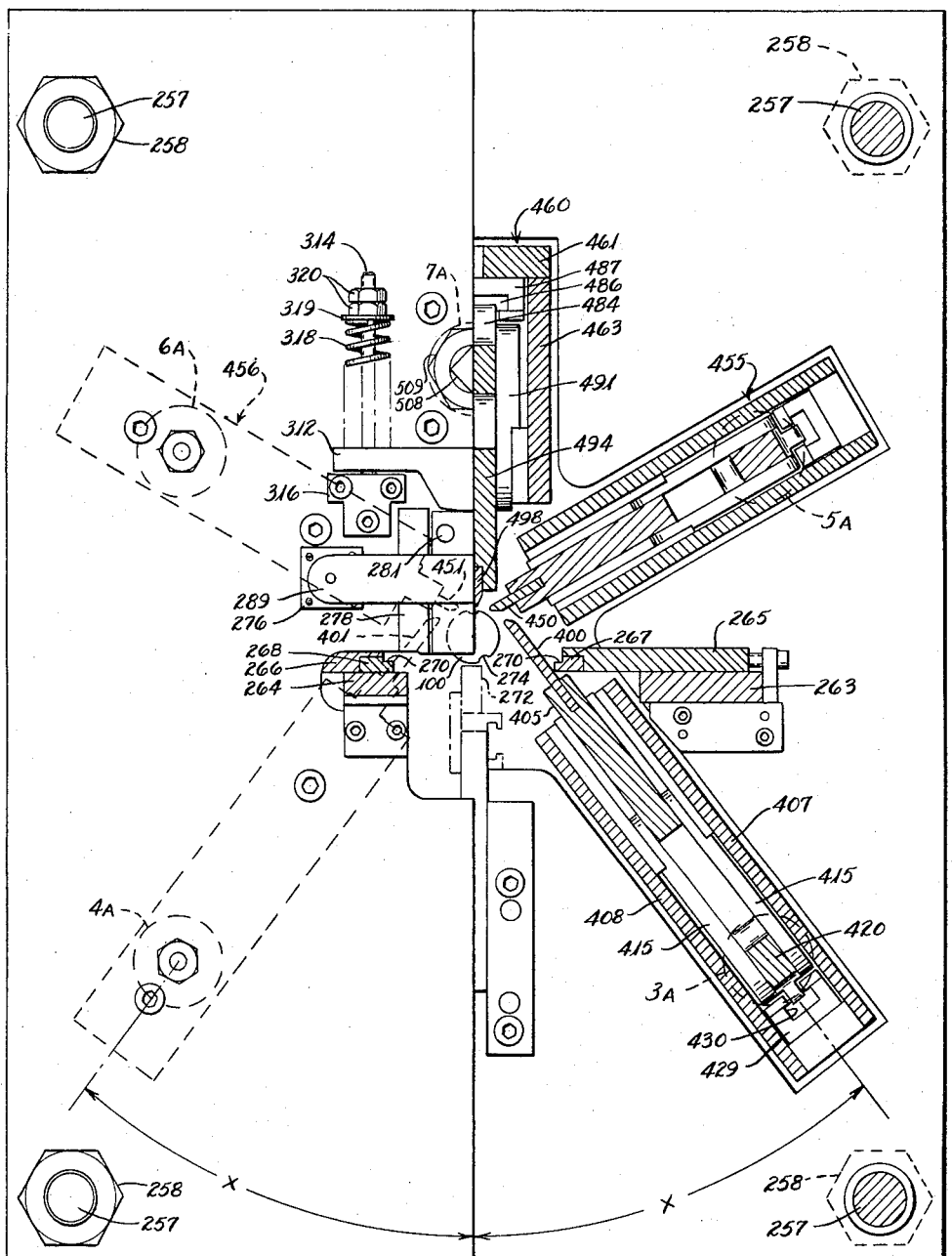
Figure 16 is an end elevational view of the forward end of the mandrel, certain parts being shown in section, illustrating the tube forming means.

The means for forming or bending a blank having flanged edges around the mandrel 100 at station E is illustrated in Figures 14, 16 and 20. The blank bending or forming means includes fluid pressure operated bars or members adapted for sequential engagement with the blank during tube forming operations. As shown in Figure 16 bars 400 and 401 are disposed respectively at each side of the mandrel 100 and each is arranged for movement in a direction at an acute angle $x$ with respect to the vertical axis through the mandrel of 37½°. Each bar is slidably supported for movement generally radially of a zone just above the mandrel 100 as shown in Figure 16 and is operated through linkage connected with fluid pressure actuated means. As each unit or mechanism for operating one of these bars is identical with the opposite unit, a description of one will suffice. As shown in Figures 16 and 20, the bar 400 of wear-resistant metal is mounted in a longitudinally extending slot formed in a supporting plate or member 405. The plate 405 is disposed within a cage or housing formed of side plates 407 and 408 which are joined together by means of end plates 410 and 411 shown in Figure 20, plate 407 being omitted from Figure 20 for purposes of illustration. The plates 410 and 411 provide guide means or ways within which the plate 405 is slidable and prevent relative endwise movement of the plate 405 and the forming bar 400. The plate 405 is provided with transversely extending pins or stub shafts 412 to which are pivotally connected pairs of links 414 and 415. The pairs of links 414 and 415 are connected by means of pins 416 and 417 with a connecting rod 420, the latter being connected by a coupling 422 with a piston rod 423. The piston rod 423 extends into a cylinder 3A and is secured to a piston (not shown) slidable within the cylinder or actuator 3A.

Disposed adjacent the connecting rod 420 and spaced lengthwise of the rod are guide blocks 428 and 429, each being formed with a T-shaped slot 430. The connecting rod 420 adjacent each of the pins 416 and 417 is provided with a T-shaped extension or projection engaging respectively in the slots 430 formed in the blocks 428 and 429. These projections on the rod 420 are slidable in the slots 430 in the blocks, the blocks 428 and 429 providing a thrust means to oppose the pressure of engagement of the bar 400 with the blank during a forming operation.

The bar 401 is mounted in a unit constructed identically with that shown in Figure 20 and is actuated by the cylinder or hydraulic actuator 4A. As shown in Figure 25, the cylinders 3A and 4A are connected together by common ducts or pipes 433 and 434 connected to the respective ends of the cylinders so that fluid flow is effective in the cylinders to cause simultaneous movement of the forming bars 400 and 401. By connecting the cylinders 3A and 4A together, the actuating pressures of bars 400 and 401 are equalized during forming operations and pressures exerted upon the blank in folding the blank H' into U-shaped configuration around the mandrel 100 are therefore equal. As shown in Figure 20 an adjustable stop member 437 is carried by the wall 411 and serves to limit the relative longitudinal movement of the connecting rod 420 through engagement of a projection 438 on the connecting rod therewith and therefore determines the limit of movement of the bar 400.

A second pair of forming units for performing further bending operations includes forming bars 450 and 451, disposed one at either side of a vertical axis through the mandrel, which are adapted to complete the formation of a tube from the blank, that is, to bend the opposite leg portions of the U-shaped configuration as shown in Figure 22 into a closed tubular formation as shown in Figure 23 wherein the flanges F and F' at the opposite edges of the blank are interlocked preparatory to a seam forming operation. Each of the bars 450 and 451 is carried by the same type of apparatus as shown in Figures 16 and 20 except that the links joining a forming bar with a connecting rod are of shorter length, as shown in Figure 16, because the bars 450 and 451 move through a lesser distance than the bars 400 and 401. As the operating mechanisms for the bars 450 and 451 are substantially identical with the operating mechanisms for forming bars 400 and 401, it is deemed unnecessary to describe these units, one of which is shown in section in Figure 16, in detail. The bar 450 is actuated by a unit 455 and the bar 451 is actuated by a unit 456. The unit 455 is operated by a cylinder or hydraulic actuator 5A and the unit 456 is actuated by cylinder 6A in a manner hereinafter explained. The bar 450 engages a leg L (shown in Figure 22) of the U-shaped formation of the blank to wrap the same around a mandrel to the position shown in Figure 23. Through an interlocking control, the bar 451 is subsequently actuated by cylinder 6A to bend the leg L' as shown around the mandrel until the flange F on the edge thereof overtakes and interlocks with the flange F' on the edge of the leg L of the blank, the configuration of the blank in tube formation and the interlocking of the flanges being shown in Figure 23.

The tube forming station E is provided with means for completing the interlock of the flanges at the edges of the blank forming a seamed and completed tube, this mechanism or seam forming unit being shown in Figures 16, 17, 18 and 19. The mechanism is inclusive of a carrier or subframe 460 which comprises a backing plate 461, side plates 463 and 464 and an end plate 465. The seam forming unit is provided with plates 466 and 467 which are secured to frame plates 250 and 252. A pair of members 468 is secured to the side plates by means of bolts 470, the members 468 forming a support for a hydraulic actuator or cylinder 7A.

The cylinder of the hydraulic actuator 7A is formed with a portion 475, the latter being provided with trunnions 476 journaled in transversely aligned openings formed in the members 468. Slidably disposed within the cylinder or actuator 7A is a piston 477 secured to the end of a piston rod 479, the latter being secured by means of a coupling 480 with a connecting rod 484. The connecting rod 484 is provided with hardened blocks 486 of T-shaped cross section which have sliding bearing engagement in T-shaped slots formed in blocks 487 secured to the backing plate 461. The interengagement of the plates 486 with the flanged blocks 487 provides guide means for properly controlling rectilinear movement of the connecting rod 484.

The connecting rod 484 is equipped with spaced pins 489 which form pivotal connections with pairs of links 491 and 492. Disposed beneath the connecting rod 484 is a plate 494 which is pivotally connected to the pairs of links 491 and 492 by means of pivot pins 496. The bar or member 494 is provided with tube seaming means or instrumentalities in the form of hardened metal members or sections 498, the lower surfaces of which are adapted for engagement with the interlocked flanges of the blank H' in order to complete the formation of a seam as shown in Figure 24. Longitudinal movement of the connecting rod 484 causes slidable movement of the sections 498 and bar 494 in a direction normal to the axis of the mandrel 100. The connecting rod 484 is formed with blocks 500 which engage in grooves formed in members 502 secured to the side plates 463 and 464, the members 502 serving to control the path of movement of the sections 498 in a direction normal to the axis of movement of the connecting rod 484.

The end plate 465 is provided with a fitting 504 in which is threaded a stop member 506 having a squared end portion 508 to receive a suitable tool for adjusting the lengthwise position of the stop member 506. The member 506 is locked in adjusted position by drawing up the lock nut 509. The connecting rod 484 is formed with a projection 511 which engages the end of the abutment or member 506, the latter serving to limit the endwise movement of the connecting rod 484 and hence the extent of transverse movement of the bar seaming instrumentalities 498. The components of this construction as shown in Figure 17 are in their maximum position of movement in forming a seam in a tube. The connecting rod 484 and associated mechanism is reciprocated to and from seam forming position by the introduction of fluid under pressure alternately through tubes or pipes 514 and 515 shown diagrammatically in Figure 25.

The sequence of operations in forming the flanged blank H' into a tube at station E is diagrammatically illustrated in Figures 21 through 24, inclusive. The blank is initially supported by the ledges 270 on the bars 267 and 268 in the manner shown in Figure 21, the mandrel 100 being in its lowermost position whereby the blank is gripped between the anvil 272 and the mandrel. The forming bars 400 and 401 are then brought into operation by the actuators or cylinders designated 3A and 4A (see Figure 25) causing these bars to concomitantly engage the blank at each side of the mandrel, bending the blank into a generally U-shaped configuration as shown in Figure 22.

The bar 450 is then actuated by the introduction of fluid into the cylinder 5A bringing bar 450 into engagement with the leg L of the blank H', the advancing bar folding or wrapping the leg L around an upper quarter zone of the mandrel until the flange F' lies in a longitudinally extending recess 275 formed in the mandrel 100. After the leg L of the blank has been formed into this position, the bar 451 is brought into operation by introduction of fluid in the actuator or cylinder 6A which advances the bar 451 into engagement with the leg L' of the blank H', folding or bending the leg L' around the remaining quarter zone of the mandrel 100, causing the flange F to slip over and interlock with the flange F' in the manner shown in Figure 23. The bars 450 and 451 remain in engagement with the blank during the completion of the seaming operation. The seaming bar is then brought into operation through the introduction of fluid into the actuator or cylinder 7A, causing the bar 498 to move into engagement with the interlocked flanged portions of the blank, pressing the flanges together in the manner shown in Figure 24 to form a completed tube. The bars 400 and 401, 450, 451 and 498 are then retracted or released in a manner hereinafter explained.

After a tube is completely formed at station E, the tube is discharged from the mandrel by operation of the transfer means or bar 75. The stripper member 92, pivotally supported at 93 upon the transfer bar 75, has an end portion normally engaging in a recses 274 formed in the lower surface of the mandrel 100. As the transfer bar 75 is moved in a righthand direction as viewed in Figure 2, the stripper member or pawl 92 is brought into engagement with an end of the completed tube T to slide the tube lengthwise from the mandrel, the mandrel 100 having been moved upwardly and away from the anvil 272 by operation of the actuators or cylinders 1A and 2A as hereinafter explained.

The various instrumentalities of the apparatus of the present invention are actuated by fluid under pressure, as for example, oil under pressure, conveyed to the several hydraulic actuators. Figure 25 illustrates diagrammatically the hydraulic or fluid circuits for carrying out the operations of the several mechanisms. Certain of the hydraulic mechanisms for carrying on various method operations are initiated into operation or are controlled by electrical means, the electrical circuits and electrically actuated instrumentalities being diagrammatically illustrated in Figure 26. The hydraulic mechanisms and their sequence of operation and the hydraulic and electrical controls and control circuits will be described in connection with the sequence of operations of the several mechanisms of the apparatus.

With particular reference first to Figure 25, the hydraulic system includes a reservoir or tank 525 adapted to contain a supply of fluid such as oil which is connected with three motor-driven pumps, viz., a pump 527 which is capable of delivering in excess of 18 gallons per minute, pump 529 of lesser capacity which is capable of delivering about 11 gallons per minute and a pump 530 of substantially the same capacity as pump 529 which, among other functions, supplies fluid or liquid under pressure for pilot control lines of the hydraulic control valves.

Figure 26:
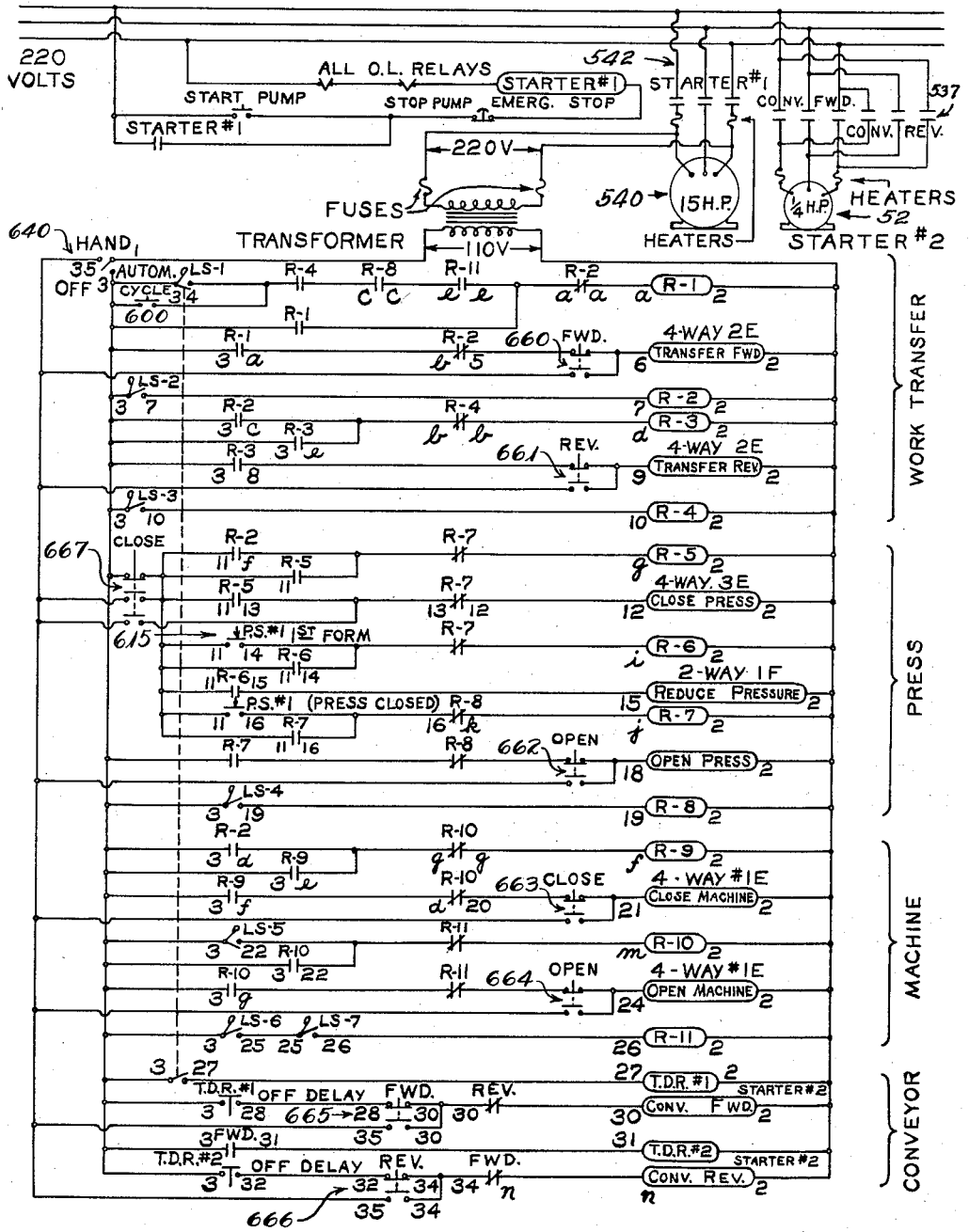
Figure 26 is a circuit diagram of the electrically energizable instrumentalities for initiating the operation of or controlling various mechanisms of the apparatus.

The electrical circuits shown in Figure 26 include several limit switches operated by movable elements of the apparatus for controlling various instrumentalities and their sequence of operation. With reference to the circuit diagram of Figure 26, LS–1 is a normally closed limit switch in operated position except when a blank is disposed at the feeding station B. LS–2 is a normally open limit switch operated when the work transferring means 75 is in its fully advanced position. LS–3 is a normally open limit switch operated when the work transfer means 75 is in normal or retracted position. LS–4 is a normally open limit switch operated when the flanging die apparatus or press is in open position. LS–5 is a normally closed limit switch operated except when the tube forming mechanism is in fully closed or tube forming position. LS–6 and LS–7 are normally open limit switches operated when the tube forming mechanism is in full open position. Other instrumentalities in the electrical circuits, hydraulic actuators and components of the hydraulic system will be described and their operation set forth in the description of operation of the machine. The following is a detailed description and explanation of the tube forming devices, actuators therefor, control mechanisms for the actuators and several devices. A multiplicity of blanks are manually deposited upon the upper flight of the conveyor 40 so that the blanks are supported by the pairs of shoes or members 45 in an upwardly inclined position as shown in Figure 2. The motor designated 52 (see Figure 26) is started by a suitable starting switch arrangement 537 which is connected to an electrical supply circuit in the conventional manner. The oil pumps 527, 529 and 530 are driven by a motor 540, the operation of which is initiated through starter switch mechanism 542.

The various mechanisms and control devices must be in certain positions in order that proper conditions are present to initiate an automatic cycle of the machine. These conditions, briefly, are: (1) a blank must be deposited in the feeding station B or by depressing the cycle push button 600 if it is desired to cycle a machine without a blank in the feeding station as when cleaning the machine; (2) the blank transfer mechanism 75 must be at normal or retracted position; (3) the blank preforming press for flanging the edges of the blank must be open and (4) the tube bending and seaming apparatus must be open.

The operations performed upon each blank as it proceeds through the several stations are as follows. The first phase in the cycle is that the blank H is pushed by the transfer mechanism 75 from the feeding station into juxtaposition with the die mechanism of the press at station C. The press closes hydraulically and preforms or flanges the edges of the blank and the dies return to open position. In the second phase the preformed blank H' is pushed by the transfer mechanism from the press (station C) into the idle station D. In the third phase the preformed blank H' at the idle station D is pushed by the transfer mechanism 75 into a position adjacent the mandrel 100. The several instrumentalities for wrapping the blank about the mandrel and completing the seam are brought into operation in proper sequence and subsequently retracted and the mandrel elevated away from the anvil. During the last phase the finished tube or shell is pushed from the mandrel 100 by the transfer mechanism 75, thus terminating a complete cycle. One blank is introduced into the campaign at each cycle and one completed shell is produced at each cycle. The machine normally operates to complete about 1200 tubes per hour, but this speed may be modified within certain limits by changing the speed at which the blank conveyor moves the blanks to the feeding station B.

The operation of the work or blank transfer mechanism will be first described with particular reference to the hydraulic arrangement shown in Figure 25 and the electrical circuits of Figure 26. The belt conveyor 40 deposits a blank at the feeding station B as shown in Figure 2. The limit switch LS–1 at the feeding station is of the double-throw type which is normally maintained in a closed position or condition by means of the spring 68, shown in Figure 2, acting upon the lever or arm 65 which is adapted to be engaged by the blank deposited at the feeding station. When the blank drops onto the lever or arm 65 of LS–1, the spring 68 is distended by the weight of the blank and LS–1 is moved to unoperated position, i.e., normally closed contact 3—4 is closed and normally open contact 3—27 is open.

With contacts 3—4 of LS–1 in closed condition, certain contacts of R–4, R–8, R–11 and R–2 are closed which completes a circuit to energize the coil a—2 of R–1, and R–1 becomes self-sustaining until the transfer bar 75 reaches its forward or blank advanced position.

The closing of contacts of R–1 completes a circuit through the transfer forward coil 6—2 of the solenoid actuated 4-way hydraulic valve 2E shown in Figure 25. The energization of coil 6—2 causes the 4-way valve 2E to be shifted or moved to a position such that fluid, such as oil, under pressure from pump 529 flows through a connection or pipe 602 to 4-way valve 2E, through this 4-way valve and through tube 77 to cylinder 9A which is the work or blank transfer actuating cylinder. When oil under pressure is thus introduced into the left end of the cylinder 9A as viewed in Figure 25, the fluid on the opposite side of the piston 80 in cylinder 9A flows out through pipe 78 to pipe 602, thus enhancing the flow of oil through the tube 77 into the opposite end of the cylinder 9A. As the cross-sectional area of the piston rod 81 in cylinder 9A is approximately one half the effective area of the piston 80, the differential in areas of the opposite faces of the piston 80 causes the piston 80 and rod 81 to be actuated in a righthand direction as viewed in Figures 2 and 25 to actuate the transfer means or bar 75 in advancing blanks at the several stations to successive positions. The fluid in the annular chamber surrounding the piston rod 81 in cylinder 9A is merely transferred to the other side of the piston and fluid from the pump 529 fills in the remaining volume in the cylinder 9A at the left side of the piston.

The transfer bar 75 and associated blank engaging pawls are thus urged in a blank advancing movement in a righthand direction as viewed in Figure 2 by introduction of fluid under pressure into the left end of the cylinder 9A. Initiation of blank advancing movement of the blank transferring mechanism releases normally open limit switch LS–3, contacts 3—10 which interacts to de-energize coil 10—2 of relay R–4 and contacts of R–4 return to normal position. As R–1 is a relay having self-sustaining characteristics, the action of contacts of R–4 has no immediate effect on the condition of the circuit.

The second action of forward motion of the transfer mechanism 75 is to release the actuator of LS–1 with the immediate effect that contacts 3—27 of limit switch LS–1 are closed under the influence of the spring 68 (see Figure 2), thus energizing coil 27—2 of time delay relay TDR–1, which is effective to prevent "plug-stopping" of the conveyor motor 52.

The transfer mechanism or bar 75, in reaching its full blank advancing position, is effective in operating the normally open limit switch LS–2, closing the contacts 3—7 thereof and completing a circuit energizing coil 7—2 of relay R–2. Contacts of R–2 are moved to their operative positions which conditions the circuit for the initiation or start of the following machine functions: (a) the transfer mechanism 75 starts its retraction movement; (b) the flanging die units are moved toward closed position and (c) the tube forming mechanism is brought into operation.

The retraction of the transfer mechanism will first be explained. The energization of coil 7—2 of R-2 functions to open a contact a—a of R-2 which is effective to deenergize coil a—2 of relay R-1. All the contacts of relay R-1 are thus moved to open position. Contact b—5 of relay R-2 is effective to deenergize the transfer forward coil 6—2 of the 4-way valve 2E permitting this valve to return to normal position whereby fluid from the pump 529 is returned to the storage tank. Contact 3—c of relay R-1 are thus moved to open position. Contact b—5 of relay R-3 which then becomes self-sustaining through its contact 3—e. Contact 3—8 of relay R-3 is closed establishing an energizing circuit to the transfer mechanism reversing coil 9—2 of the solenoid actuating means for the 4-way valve 2E which is then moved to a position such that hydraulic fluid flows from the pump 529 through tubes 602 and 78 into the rod end of the cylinder 9A. The fluid or oil from the left side of the piston 80 in the cylinder 9A flows through tube 77 through 4-way valve 2E through pipe 604, through the sequence and check valve 7C through pipes 606 and 608 through the oil cooler 609 and is returned to the reservoir or tank 525. Thus as oil moves into the rod end of the cylinder 9A, the work transfer mechanism is moved to its completely retracted position in preparation for the next cycle.

The retracting motion of the transfer bar 75 releases the limit switch LS-2, the contacts 3—7 of this limit switch opening to deenergize the coil 7—2 of relay R-2. This action does not immediately affect the circuit due to the self-sustaining characteristic of relay R-3.

When the work transfer mechanism 75 reaches its normal or retracted position, the limit switch LS-3 is operated, the contacts 3—10 of this switch closing to establish an energizing circuit to coil 10—2 of relay R-4. The normally closed contacts b—b of relay R-4 are operated which deenergizes the coil d—2 of relay R-3. Contacts 3—8 of relay R-3 are opened which deenergizes the blank transfer reverse coil 9—2 of 4-way valve 2E causing the latter to return to normal position. When 4-way valve 2E returns to normal position, flow of oil to cylinder 9A ceases and the flow of the pump is directed back to the storage tank or reservoir 525.

The electrical and hydraulic components and their operation in actuating and controlling the dies for forming flanges at the edges of a blank at station C will now be described. Relay R-2 is energized and contacts 11—f thereof are closed which completes the circuit energizing coil g—2 of relay R-5 and other contacts of relay R-5 are moved to operative positions. The relay R-5 is self-sustaining, and the circuit will not be affected by subsequent opening of contacts 11—f of relay R-2. The closing of contacts 11—13 of relay R-5 causes energization of coil 12—2 of the electrically controlled 4-way valve 3E. This movement of the 4-way valve 3E causes fluid flow to occur as follows (see Figure 25). Fluid from the pump 530 flows through pipe 606 through relief valve 1D through the pipes 607 and 608 through the 4-way valve 3E and through pipe 114 to the upper end of cylinder or actuator 8A above the piston 117, the actuator 8A effecting movement of the press ram or platen 110. The oil beneath the piston 117 in cylinder 8A flows through pipes 115 and 609 through the 4-way valve 3E through pipes 611, 612 and 608 through the cooler 609 into the tank 525. The fluid flow as above described exerts pressure above piston 117 in cylinder 8A and causes the press ram 110 to be moved toward closed position through the medium of the toggle linkage shown in Figures 1, 3 and 4.

At the start of downward movement of the ram 110 carrying the die section 112, the plungers in the single acting hydraulic actuators or cylinders 10A, 11A, associated with die section 112, and the plungers in actuators 12A, 13A, associated with the lower die section or pressure pad 163, are fully extended to the limits of their travel.

Initial movement of the press ram 110 downwardly effects a release of limit switch LS-4 (see Figure 26) by opening the contacts of this switch. During the first closing motion of the dies at station C, the fluid or oil in cylinders 10A and 11A is blocked in as no oil flow takes place due to the check valve 4B. Fluid flow does not normally occur from cylinders 10A and 11A through the relief valve 2D due to the fact that the valve is set to relieve at higher pressures than the pressures normally encountered during the initial movement of the press ram 110 during the press closing cycle. Thus the fluid in cylinders 10A and 11A holds the upper forming die or punch 112 against relative movement with respect to the movable ram or platen 110 of the press.

During the first closing movement of the flanging dies, fluid or oil contained in the cylinders 12A and 13A below the pistons is blocked in by the check valve 5B but is permitted to flow through relief valve 3D and through pipes 614, 612 and 608 through cooler 609 into the storage tank 525. The pressure setting of the relief valve 3D is the condition determining whether fluid or oil flows away from the cylinders 12A and 13A. The relief valve 3D is adjustable to determine the pressure at which relief will take place and is regulated or adjusted to produce sufficient pressure in cylinders 12A and 13A to firmly grip the blank after the forming die or punch 112 moves into engagement with the blank H supported by the lower die or pressure pad 163 (see Figure 6). As the blank is moved downwardly the die section or pressure pad 163 is moved downwardly by the die 112 and the plungers or pistons 170 in cylinders 12A and 13A are moved downwardly, displacing the fluid which flows back into the tank 525.

When the die section or pressure pad 163 has reached the lowermost limit of its travel, fluid pressure increases in the cylinder 8A above the piston 117 due to the high pressure setting of relief valve 2D, this pressure being impressed upon pressure switch 615 (see Figure 26), causing contacts 11—14 of the pressure switch to close. The closing of contacts 11—14 is effective to complete a circuit energizing coil i—2 of relay R-6 and all contacts of relay R-6 move to operated position. The relay R-6 is self-sustaining through its contacts 11—14.

Contacts 11—15 of relay R-6 being closed are effective to complete a circuit through coil 15—2 controlling the operation of 2-way valve 1F. Under the influence of the energization of coil 15—2, 2-way valve 1F is moved to establish communication between the relief valve 2D and relief valve 4D through pipes 617 and 618. Relief valve 4D is associated with relief valve 2D in a manner that when pressure communication exists between these valves, relief valve 2D will be controlled by the pressure setting of relief valve 4D provided the pressure setting of relief valve 4D is lower than the pressure setting of relief valve 2D. Relief valve 4D is adjusted to a fluid pressure setting just sufficient to cause the blank to be firmly gripped between the die sections 112 and 163.

The conditions in the electrical circuits and fluid system at the end of the first or initial stage of downward movement or closing movement of the die sections are as follows. At the end of the first stage, high fluid pressure exists in cylinders 10A and 11A due to the particular pressure setting of relief valve 2D and sufficient pressure exists in cylinder 8A to actuate contacts 11—14 of pressure switch 615. Communication of relief valve 2D through 2-way valve 1F and through the relief valve 4D to the fluid storage tank 525 is effective in establishing fluid flow through pipe 157 from cylinders 10A and 11A through the relief valve 2D through pipes 612, 608 and cooler 609 to the tank 525. The pressures in cylinders 10A and 11A drop or are lowered to the pressure setting of relief valve 4D whereby the pressure drops in cylinder 8A, contacts 11—14 of pressure switch 615 are opened and the mechanism of the press goes into the second stage of downward movement. In this stage of movement of the dies, the lower die or pressure pad 163 has reached the limit of its downward travel and the upper die 112 reaches the limit of its downward movement. The blank is firmly gripped between the dies 112 and 163 by reason of the pressure existing in cylinders 10A and 11A, which pressure is dependent upon or controlled by the pressure setting of relief valve 4D.

However, downward motion of the movable platen or ram 110 continues and, during the additional movement, the cam member 222, carried by the platen or ram 110, moves into engagement with the cam block or follower 218 carried by the transversely movable plate 209 and actuates the forming plate or die 214 into engagement with one edge of the blank H to complete the formation of the flange F. Simultaneously, the downward movement of the platen 110 moves the forming plate or bar 202 into engagement with the opposite edge zone of the blank and completes the formation of the flange F', and the plungers or pistons in cylinders or actuators 10A and 11A are urged toward a retracted position. When the downward movement of the ram or platen 110 is completed and the die elements are in closed position, the flanges are fully formed on the blank. As soon as the platen 110 is at the limit of its downward travel, pressure increases in the cylinder or actuator 8A which is in communication with a pressure switch 615. Contacts 11—14 of the pressure switch are closed with no immediate effect on the circuit status. Further increase in pressure in cylinder 8A is effective to operate contacts 11—16 of the pressure switch, which action is effective to complete a circuit energizing coil j—2 of relay R–7, the latter being self-sustaining through its contacts 11—16.

Contacts 13—12 of relay R–7 open and solenoid coil 12—2 of the 4-way valve 3E is deenergized and coil g—2 of relay R–5 is deenergized and the "press open" solenoid coil 18—2 becomes energized.

By reason of the energization of the "press open" coil 18—2 while the coil 12—2 of 4-way valve 3E is deenergized, the 4-way valve 3E is shifted to a position causing fluid flow through the hydraulic system as follows. Oil from the pump 530 flows through relief valve 1D through pipes 607 and 608 through 4-way valve E3 and pipes 609 and 115 to the lower end of cylinder 8A. Oil from the upper end of the cylinder 8A above the piston 117 flows through pipe 114 through 4-way valve 3E through pipes 611, 612 and 608 through the oil cooler 609 into the tank 525. In this manner the piston of cylinder 8A and mechanism carried thereby including die 112 are moved or retracted upwardly.

As the platen 110 and associated mechanisms move upwardly, the pressures on the plungers in the cylinders or actuators 10A, 11A, 12A and 13A are relieved, and some of the fluid flowing through pipe 609 is diverted through check valves 4B and 5B to the cylinders 10A, 11A, 12A and 13A. The flow of fluid into cylinders 12A and 13A urges the plungers therein upwardly, moving the pressure pad or die 163 to its uppermost position, while the fluid flowing into the cylinders 10A and 11A moves the plungers therein downwardly to retain the die 112 in its initial position spaced from the platen 110. As the plungers in cylinders 10A through 13A reach their outermost positions, the flow of fluid through check valves 4B and 5B creases and upward motion of the platen and piston 117 in cylinder 8A continues until the platen 110 reaches its uppermost or open position.

When the platen of the press reaches its full open position, limit switch LS–4 is actuated closing contacts 3—19 thereof which completes a circuit energizing coil 19—2 of relay R–8. The contacts 16—k of relay R–8 are operated to deenergize "open press" coil 18—2 of 4-way valve 3E, the latter being shifted to normal position. Fluid then flows from pump 530 through relief valve 1D through pipes 607 and 608 through 4-way valve 3E and through pipes 611, 612 and 608 through cooler 609 into the tank 525. Further effect of the deenergization of coil 19—2 of relay R–8 is that contacts c—c of relay R–8 associated with coil a—2 of relay R–1 conditions the circuit for the next cycle.

It should be noted that relay R–2 was energized at the time the blank transferring mechanism 75 reached its advanced position and that contacts 3—d of relay R–2 associated with coil f—2 of relay R–9 are closed and are effective in energizing coil f—2 of relay R–9, coil f—2 being self-sustaining through contacts 3—e of relay R–9.

Another set of contacts 3—f of relay R–9 is effective in energizing solenoid coil 21—2 of 4-way valve 1E. Energization of coil 21—2 causes the valve 1E to move into a position providing for fluid flow as follows. From the high capacity pump 527 fluid is directed through pipe 620 through 4-way valve 1E and through pipe 622 to the sequence and check valve 1C (which is in blocked position) and through pipes 624, 625 and 306 into the rod ends of cylinders or actuators 1A and 2A. Cylinder 1A shown in Figure 11 operates the mandrel supporting and moving means and cylinder 2A shown in Figure 14 operates the abutment or thrust block 340 engageable with the rear end of the mandrel. It should be noted that cylinders 1A and 2A have a common inlet 306 and hence are simultaneously actuated in moving the mandrel supporting means and the mandrel abutment or thrust block. During the introduction of oil or fluid into the rod ends of cylinders 1A and 2A through pipe 306, oil from the other ends of the cylinders flows therefrom through pipes 305 and 627 through the check valve passage of the sequence and check valve 6C through pipe 629, through 4-way valve 1E and pipe 630 through the cooler 609 and into the tank 525. When the rods of cylinders 1A and 2A are extended to their outermost positions the mandrel is lifted through the mechanism shown in Figure 11 and the abutment 340 is elevated as shown in Figure 14. When the rods are retracted, the mandrel and abutment block are lowered under the action of springs 318 and 326 shown in Figures 11 and 14. The springs, acting upon the mandrel, cause the blank H' to be securely gripped between the mandrel and the underlying anvil 272.

It has been mentioned that introduction of fluid into cylinders 1A and 2A through pipe 306 urges the pistons toward retracted position. The initial motion of the pistons toward retracted position releases limit switches LS–6 and LS–7, opening contacts 3—25 of LS–6 and contacts 25—26 of LS–7 which act to deenergize coil 26—2 of relay R–11. This has no immediate effect on the circuit status, but contacts e—e of relay R–11 associated with coil a—2 of relay R–1 being open insure that another cycle cannot be started until the instant cycle is completed.

When the pistons in cylinders 1A and 2A reach the limit of their travel (retracted position) into the cylinders, fluid pressure increases to a value sufficient to open the pressure-operated sequence and check valve 2C. Valve 2C is constructed so that high pressure acting on the valve through pipe 624 will open the valve and once opened, a comparatively low pressure in pipe 632 will suffice to hold the valve open.

As soon as the sequence and check valve 2C is open, flow of fluid is diverted from cylinders 1A and 2A through sequence and check valve 2C and to cylinders 3A and 4A and fluid from the opposite ends of cylinders 3A and 4A is returned to the fluid storage tank 525. Cylinders 3A and 4A are each respectively associated with forming bar units provided with tube forming bars 400 and 401 as shown in Figure 16. When the pistons in cylinders 3A and 4A are moved in a righthand direction as viewed in Figure 25, the forming bars 400 and 401 are urged upwardly toward and past the mandrel and during such movement engage the blank H', bending or forming the same to the U-shaped configuration as shown in Figure 22. When the pistons in cylinders 3A and 4A reach the limit of their travel in a blank forming operation, pressure builds up at the left sides of the pistons as viewed in Figure 25 and closes the sequence and check valve 3C to cause flow of fluid through pipe 633 into cylinder 5A.

Cylinder or actuator 5A is associated with a third forming unit carrying a forming bar 450 shown in Figure 16. When the piston in cylinder 5A is moved in a righthand direction as viewed in Figure 25, the forming bar 450 engages the leg L shown in Figure 22 and bends it around the mandrel with the terminal portion of the flange F' projecting outwardly from the recess 275 formed in the mandrel. When the piston in cylinder 5A reaches the outermost limit of its stroke, pressure builds up and closes the sequence and check valve 4C in the same manner as the check valve 2C was operated. This action connects pipe 635 of cylinder 6A with fluid from the pump 527. The cylinder or actuator 1A actuates forming bar 451 in completing a tube construction around the mandrel 100. When the piston in cylinder 6A is moved in a righthand direction as viewed in Figure 25, the forming bar 451 engages the leg L' of the U-shaped formation shown in Figure 22 and bends the leg about the remaining portion or zone of the mandrel 100. During this bending operation, the lip of flange F is hooked or interlocked with the outwardly extending portion of the flange F', the arrangement of interlocked flanges being shown in Figure 23.

When the piston in the actuator or cylinder 6A reaches the limit of its stroke in bending the remaining portion of the blank around the mandrel, pressure builds up in pipe 635 and closes the sequence and check valve 5C to cause fluid to flow to the cylinder 7A. The cylinder 7A is the actuating means for the seaming bar 498 for completing the formation of a seam at the interlocked flanges of the blank. When the piston in cylinder 7A is extended in a righthand direction as viewed in Figure 25, the bar 498 presses the interlocked flanges together forming a lock seam which completes the tube or shell member T.

The mechanisms of the seaming unit are all in completely closed position and the last motion of the mechanism actuated by cylinder 7A is effective to actuate limit switch LS-5.

The actuation of limit switch LS-5 is effective in closing contacts 3—22 of limit switch LS-5 and this establishes a circuit to energize coil m—2 of relay R-10, this relay being of the self-sustaining type. The energization of coil m—2 of relay R-10 is effective in opening contacts d—20 of relay R-10 which in turn deenergizes the "close machine" coil 21—2 of the 4-way valve 1E. The deenergization of coil m—2 of relay R-10 causes closing of contacts 3—g of relay R-10 and this action is effective to energize "open machine" coil 24—2 of 4-way valve 1E. A further effect of deenergization of coil m—2 of relay R-10 is to cause opening of contacts g—g of relay R-10 which is effective to deenergize coil f—2 of relay R-9.

The deenergization of "close machine" coil 21—2 and the energization of "open machine" coil 24—2 of 4-way valve 1E are effective to shift the valve so that fluid flow occurs as follows. With reference to Figure 25, fluid under pressure from pump 527 flows through pipe 620 through 4-way valve 1E and through pipe 629 to the righthand ends of cylinders 3A through 7A to retract all of the cylinders simultaneously. The sequence and check valve 1C is of the pressure-operated type, arranged so that pressure in pipe 629 causes the valve 1C to open. Fluid flow occurs away from the left end of cylinder 7A as viewed in Figure 25 through the sequence and check valve 5C and through pipe 624 through sequence and check valve 1C and thence through either of pipes 630 or 636 through the cooler 609 and into the tank 525. The fluid in the lefthand ends of cylinders 3A through 6A is caused to return to reservoir 525 through sequence and check valves 2C through 4C and through the same path as the fluid returned from cylinder 7A. The retraction of pistons in the several cylinders or actuators 3A through 7A are effective in restoring the forming bars 400, 401, 450, 451 and 498 of the tube forming units to their normal open positions.

The initial retracting motion of the piston in cylinder 7A is effective to operate limit switch LS-5 opening contacts 3—22 thereof, which action has no immediate effect on the circuit condition. When the pistons of all of the cylinders or actuators 3A through 7A reach the limit of their retracted travel, fluid pressure is built up in pipe 629 which is effective to close sequence and check valve 6C, establishing fluid communication from the pump 527 through pipes 627 and 305 to the righthand ends of cylinders 1A and 2A as viewed in Figure 25. The sequence and check valve 6C is arranged or adjusted to require high pressure in the pipe 629 to close the valve. The opposite ends of the cylinders 1A and 2A are in communication with the tank 525 through pipes 625 and 624. Under the influence of fluid flow into the righthand ends of cylinders 1A and 2A, the pistons in these cylinders are urged to their extended positions, the movement of these pistons being effective to operate the linkage mechanisms shown in Figures 11 and 14 to lift the mandrel 100 and abutment block 340 to their uppermost position away from the anvil 272 so that the finished tube or hollow body may be ejected from the mandrel by the pawl 92 carried by the blank transfer means or bar 75 in preparation for the reception of a new blank adjacent the mandrel.

The pistons in cylinders 1A and 2A in approaching their positions at the lefthand ends of the cylinders as viewed in Figure 25 cause the operation of limit switches LS-6 and LS-7, closing their respective contacts 3—25 and 25—26 which action is effective to energize coil 26—2 of relay R-11. The energization of the coil of relay R-11 is effective to deenergize "open machine" coil 24—2 of the 4-way valve 1E. This causes a shifting of the valve 1E to such a position that fluid flowing from pump 527 is directed back into the tank 525.

A further action or effect of the energization of relay R-11 is the closing of contacts e—e of relay R-11 associated with coil a—2 of relay R-1 which prepares the circuit for the initiation of a new cycle. The new cycle starts if and when all other necessary conditions for operation are fulfilled.

As shown in diagram Figure 26, there is provided an automatic selector switch 640 which is associated with a series of manually operated or push button switches or contacts 660, 661, 662, 663, 664, 665, 666 and 667 for operating the various components of the machine by hand. This may be accomplished whenever the selective switch is set so that the contacts 1—35 thereof are closed. Such control of the operation of individual mechanisms is desirable in cleaning the machine and to adjust the various mechanisms.

It has been stated that several conditions of the machine must be fulfilled to enable the starting of the automatic cycle. If any one or more of the necessary conditions are not fulfilled, the automatic cycle will not start and the conveyor will be rendered idle or "plug-stopped." This "plug-stopping" of the conveyor is necessary to prevent jamming of a blank in the loading station A if the machine is not in condition to cycle.

The plug-stopping is accomplished as follows. With reference to Figure 26, it will be noted that a time delay relay TDR-1 coil 27—2 is maintained energized at all times except when a blank is in the feeding station B (see Figure 2). Normally open contacts 3—28 of TDR-1 are closed when coil 27—2 is energized and, through this contact, the "conveyor forward" coil 30—2 of an automatic motor starting switch is energized and the conveyor moves forward. Deposition of a blank in the feeding station causes contact 3—27 of LS-1 to open and coil 27—2 of relay TDR-1 becomes deenergized.

However, contact 3—28 of TDR–1 remains closed for an interval and the conveyor 40 continues to advance.

If the blank at the feeding station B is removed from the feeding station during this interval (as is normal in the automatic operation of the machine), contacts 3—27 of limit switch LS–1 again become closed, restoring energization to coil 27—2 of TDR–1, contacts 3—28 of TDR–1 do not open and the conveyor proceeds without interruption. However, if the blank at station B still remains in the feeding station at termination of timed interval mentioned above, contacts 3—28 of TDR–1 open and power supply to the conveyor driving motor is interrupted. Contacts 3—31 are maintained closed at all times that coil 30—2 of automatic motor switch is energized.

Contacts 3—32 of a second time delay relay TDR–2 are maintained closed whenever coil 34—2 of the reversing starting switch is energized and for an interval after coil 30—2 is deenergized. As soon as coil 30—2 is denergized, contacts 34—$n$ of the automatic starting switch close, completing a circuit through coil $n$—2 of electrical automatic starting switch. Coil $n$—2 becomes energized and power is supplied to the conveyor drive motor through the conventional electrical motor circuit tending to drive the motor in the reverse direction.

At the end of the interval during which contacts 3—32 persist in remaining closed after contacts 3—31 of the automatic starting switch were opened, current supply to coil $n$—2 is interrupted, thereby interrupting power supply to conveyor drive motor. The timed interval is adjusted to supply power in the reverse direction to the conveyor drive motor sufficient to overcome the inertia of its forward rotation and bring the motor to a stop. The operation of the apparatus will not continue until the difficulty is corrected or other cause of interruption removed or remedied.

Another feature of the hydraulic system resides in the maintenance of adequate fluid pressure to operate the valves of the system. The 4-way valves 1E, 2E and 3E are of the electrically controlled, pilot pressure-operated type. It is undesirable to operate the fluid pumps under a back pressure when the flow of hydraulic fluid is from the pumps through the 4-way valves into the storage tank, i. e., when the fluid is not required for useful work. However, a source of pressure is required to the valves when the pumps are idling, i. e., pumping hydraulic normal volume of fluid into an unrestricted line returning the fluid to the storage tank.

This is accomplished through the following arrangement. With reference to Figure 25, the system includes an accumulator 1G which consists of two pistons 642 and 644, rigidly attached to each other and of different areas, which are disposed respectively in chambers 645 and 646. Compressed air is admitted to chamber 645 and oil admitted to chamber 646. When compressed air is present in chamber 645 and oil in the chamber 646, the pressure on the oil will be a function of the pressure of the compressed air. This accumulator unit is arranged to produce a source of hydraulic fluid for operating the 4-way valves 1E, 2E and 3E. Any differential in pressures effective on the pistons tends to change the positions of the pistons in the chambers.

Thus, any decrease in pressure in the oil chamber, indicating a requirement for oil pressure to operate a valve, will result in downward movement of the pistons under the pressure of the compressed air and oil will flow to the point of requirement. Conversely, an increase of pressure on the oil will cause the oil to flow into the fluid chamber. If the increase in oil pressure persists for a period of time, the pistons will be moved to their upper limits of travel, at which time the accumulator is fully charged, and no further motion of the pistons will occur regardless of the extent of pressure on the oil. When demand is made for oil pressure due to normal valve requirements, leakage, or other reason, indicated by a reduced pressure on the oil, the pistons 645 and 646 will move downwardly. When they reach their limit of travel, the accumulator will be fully discharged and no pressure will be available for useful purpose.

When the machine has been idle for a period of time, the accumulator may become discharged and oil pressure is not present to operate the valves. The hydraulic system is arranged to promptly and automatically restore operating conditions as follows. Upon starting the oil pumps, oil flows from the pump 529 through pipe 602 through 4-way valve 2E and pipe 604 to the sequence and check valve 7C. Sequence and check valve 7C is a pilot pressure-operated valve arranged so that when pilot pressure exists, flow through the valve is unrestricted.

However, when no pilot pressure is established, the valve 7C is closed and oil cannot flow through this valve. Therefore pressure builds up on the pump 529 and flow is directed through pipe 650 through check valve 6B to the fluid chamber 644 of accumulator 1G. This restores pilot pressure which is effective to open the sequence and check valve 7C and permits normal flow of the oil back to the storage tank 525.

In the normal operation of the machine, oil is supplied to accumulator 1G by any one or all of the three pumps whenever fluid pressure in accumulator 1G is less than the delivery pressure of the pumps. Thus oil from pump 527 flows through check valve 2B to the accumulator 1G, and oil from pump 530 flows through relief valve 1D, pipe 607 and through check valve 3B to the accumulator 1G. The check valves prevent return flow when the pump pressures are lower than pressure of oil in accumulator 1G. By the above-described arrangement, accumulator 1G is maintained fully or nearly fully charged.

All of the pumps are protected against excessive pressures by means of relief valves (not shown) which are embodied as integral components of the pumps.

While not essential to the operation of the machine, the hydraulic system preferably includes an accumulator 2G operating in conjunction with a check valve 1B to prevent damage and hydraulic "hammer" due to sudden pressure increases in the system which sometimes occur during operation of the machine.

In the operation of a hydraulic pump in combination with a 4-way valve and a relief valve embodied in the pump, a condition may arise when the 4-way valve is shifting wherein oil flow from the pump is completely blocked, i. e., has no outlet. The oil pressure rises to the relief setting of the relief valve sufficient to operate the relief valve which diverts the oil flow directly back to the fluid storage tank 525. However, due to the inertia of the relief valve, prompt action is not obtained, and a sudden pressure rise will not instantly open the relief valve, and the pressure increase continues to a valve greatly in excess of the relief valve setting. A lower pressure adjustment of the relief valve is not feasible inasmuch as a slow rise in pressure to the relief setting of the valve, occurring in normal operation of the machine, would effect a dissipation of oil flow from the pump directly to the storage tank.

The purpose and function of accumulator 2G are to accommodate or cushion the oil flow at the time excess pressure tends to develop. There is no fluid flow into the accumulator 2G until the pressure reaches a value approximately that of the relief setting of the pump relief valve. When this condition obtains, oil flow starts into accumulator 2G through check valve 1B and a restricted orifice circuit to the accumulator. The construction of accumulator 2G is such that oil flow into it is progressively decreased at an increasing pressure as it becomes charged. Thus its effect is to cushion sudden pressure rises in the system.

After accumulator 2G has acquired a charge of oil and pump pressure drops to a value less than pressure in the accumulator, the accumulator discharges through the restricted orifice circuit of check valve 1B. The check valve IB permits the accumulator to be charged quickly, and the restricted orifice provides for slow discharge in order to prevent sudden return or "dumping" of oil from the accumulator into the fluid system.

The apparatus illustrated and described is particularly adapted for producing tubes from blanks which are perforated with many small openings, such tubes being used as gas passage and sound attenuating means in muffler constructions. The small openings are punched in the blank and result in burrs which renders the stacking of perforated blanks impractical. The conveyor 40 supports the blanks in spaced, inclined position and, therefore, is adapted to support and convey perforated or unperforated blanks.

It is apparent that, within the scope of the invention, modifications and different arrangements may be made other than is herein disclosed, and the present disclosure is illustrative merely, the invention comprehending all variations thereof.

I claim:

1. Apparatus for forming tubes from sheet metal blanks including, in combination, a relatively movable mandrel, a relatively stationary anvil disposed adjacent the mandrel, means engaging an end zone of the mandrel for supporting the same, resilient means normally biasing the mandrel toward the anvil, hydraulically operated means connected to said mandrel supporting means for effecting relative movement of the mandrel for admitting a sheet metal blank having flanged edge portions between the anvil and mandrel, a relatively movable abutment adapted to engage the opposite end zone of the mandrel, hydraulically operated means for effecting movement of the abutment, means engageable with the blank for forming the blank around the mandrel to interengage the flanges to form a tube, and control means for causing concomitant operation of both hydraulic means.

2. Apparatus for forming tubes from sheet metal blanks including, in combination, a frame, a vertically movable mandrel supported upon the frame, resilient means biasing the mandrel toward its lower position, hydraulically actuated means for moving the mandrel to its uppermost position, an anvil disposed beneath the mandrel, means for successively advancing blanks to a position between the mandrel and anvil, a pair of plate-like members, the members being disposed respectively at opposite sides of a vertical plane through the mandrel and movable in planes inclined upwardly toward the mandrel, a second pair of plate-like members, the members of the second pair being arranged at opposite sides of a vertical plane through the mandrel and inclined downwardly toward the mandrel, fluid pressure actuators individual to each of said members, linkage connecting a fluid actuator to its adjacent member whereby the force of the fluid actuator in moving a member toward the mandrel is multiplied through said linkage, said pairs of members being arranged to successively engage the blank to bend the same, control means for initiating the operation of said fluid actuators whereby said second pair of plate-like members is actuated toward blank bending position after the first-mentioned pair of plate-like members has been moved to a position bending a blank partially around the mandrel, a seam-closing bar disposed above the mandrel and in parallelism therewith and arranged to engage overlapping portions of the blank bent around the mandrel, a fluid actuator for said seam-closing bar, linkage connecting the seam-closing bar with its fluid actuator, and means for stripping a finished tube from the mandrel.

3. Apparatus for forming tubes from sheet metal blanks having flanged edges including in combination, a frame, a relatively movable mandrel carried by the frame, an anvil disposed adjacent the mandrel, resilient means normally biasing the mandrel toward the anvil, means for moving the mandrel away from the anvil to admit a metal blank between the mandrel and the anvil, a pair of plate-like members disposed respectively at opposite sides of the mandrel and movable toward the mandrel in upwardly inclined convergent planes, a second pair of plate-like members arranged at opposite sides of the mandrel and movable toward the mandrel in downwardly inclined convergent planes, fluid pressure actuators for moving said members, means for initiating the operation of actuators to move said first mentioned pair of members to bend a blank partially around the mandrel, means operable upon completion of the bending operation of said first mentioned members to initiate the operation of the actuators of the second pair of members to complete the bending of the blank around the mandrel and interengage the flanged edges of the blank to form a tube, a seam closing bar disposed in parallelism with the mandrel, means for moving the bar into engagement with the region of interengagement of the flanged edges of the tube to form a seam, and means for stripping the seamed tube from the mandrel.

4. Apparatus for forming tubes from sheet metal blanks having flanged edges including in combination, a frame, a horizontally disposed, vertically movable mandrel carried by the frame, a stationary anvil disposed beneath the mandrel, resilient means normally biasing the mandrel toward the anvil, means for moving the mandrel to its uppermost position to admit a metal blank between the mandrel and the anvil, means for successively advancing blanks to a position between the mandrel and anvil, a pair of plate-like members disposed respectively at opposite sides of a vertical plane through the mandrel and movable in upwardly inclined convergent planes, a second pair of plate-like members arranged at opposite sides of a vertical plane through the mandrel and movable in downwardly inclined convergent planes, fluid pressure actuator means to move each of said members, means for initiating the operation of the actuator means for said first mentioned pair of members to bend a blank partially around the mandrel, means operable upon completion of the bending operation of said first mentioned members to initiate the operation of the actuator means for said second pair of members to complete the bending of the blank around the mandrel and interengage the flanged edges of the blank to form a tube, a seam closing bar disposed in parallelism with the mandrel, means for moving the bar into engagement with the region of interengagement of the flanged edges of the tube to form a seam, and means for stripping the seamed tube from the mandrel.

5. Apparatus for forming tubes from sheet metal blanks having flanged edges including in combination, a frame, a horizontally disposed, vertically movable mandrel carried by the frame, an anvil disposed beneath the mandrel, resilient means normally biasing the mandrel toward the anvil, means for moving the mandrel away from the anvil to admit a metal blank between the mandrel and the anvil, means for successively advancing blanks to a position between the mandrel and anvil, a pair of plates disposed respectively at opposite sides of a vertical plane through the mandrel and movable toward the mandrel in upwardly inclined convergent planes, a second pair of plates disposed at opposite sides of a vertical plane through the mandrel and movable toward the mandrel in downwardly inclined convergent planes, fluid pressure actuators individual to each of said plates, linkage connecting each plate with its adjacent actuator whereby the force of the actuator in moving a member toward the mandrel is multiplied through the linkage, means for initiating the operation of the actuators for said first mentioned pair of members to bend a blank partially around the mandrel, means operable upon completion of the bending operation of said first mentioned members to initiate the operation of the actuators for said second pair of members to complete the bending of the blank around the mandrel and interengage the flanged edges of the blank to form a tube, a seam closing bar disposed in parallelism with the mandrel, means for moving the bar into engagement with the region of interengagement of the flanged edges of the tube to form a seam, and means for stripping the seamed tube from the mandrel.

References Cited in the file of this patent

UNITED STATES PATENTS

| | | |
|---|---|---|
| 498,810 | Norton et al. | June 6, 1893 |
| 950,742 | Black | Mar. 1, 1910 |
| 1,429,328 | Domizi | Sept. 19, 1922 |
| 1,629,813 | Stevenson | May 24, 1927 |
| 1,917,359 | Cameron | July 11, 1933 |
| 2,116,971 | Haslauer | May 10, 1938 |
| 2,142,235 | Burns | Jan. 3, 1939 |
| 2,566,423 | Miller | Sept. 4, 1951 |
| 2,644,416 | Miller et al. | July 7, 1953 |